Jan. 24, 1956  G. H. RIDINGS ET AL  2,732,276
FACSIMILE TRANSMISSION SYSTEM AND APPARATUS
Filed June 16, 1948  12 Sheets-Sheet 1
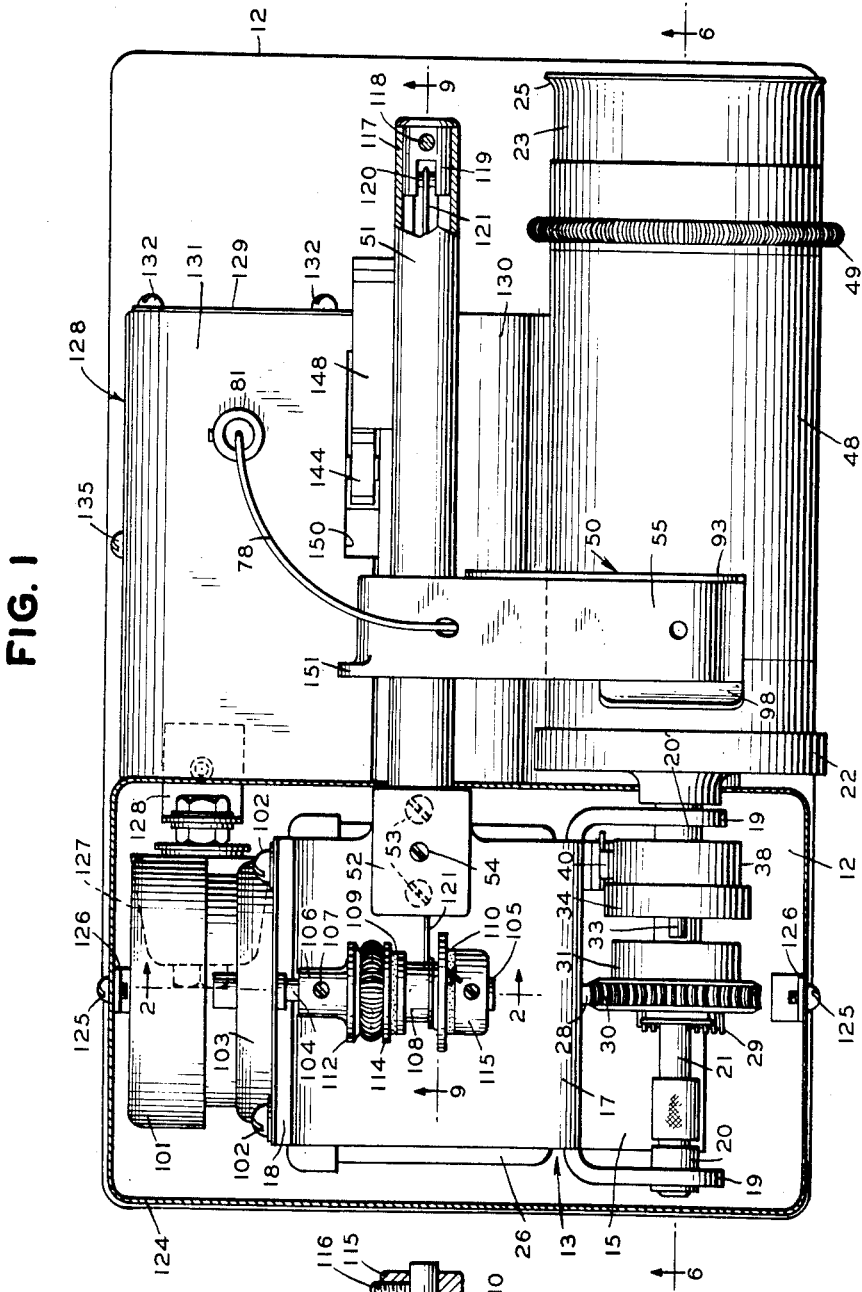
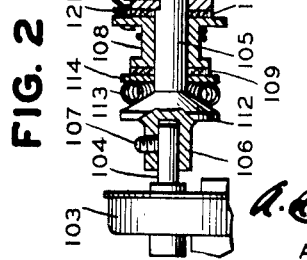
INVENTORS
G. H. RIDINGS
J. H. HACKENBERG
R. J. WISE
G. B. WORTHEN
D. M. ZABRISKIE
BY
A. C. Thomas
ATTORNEY

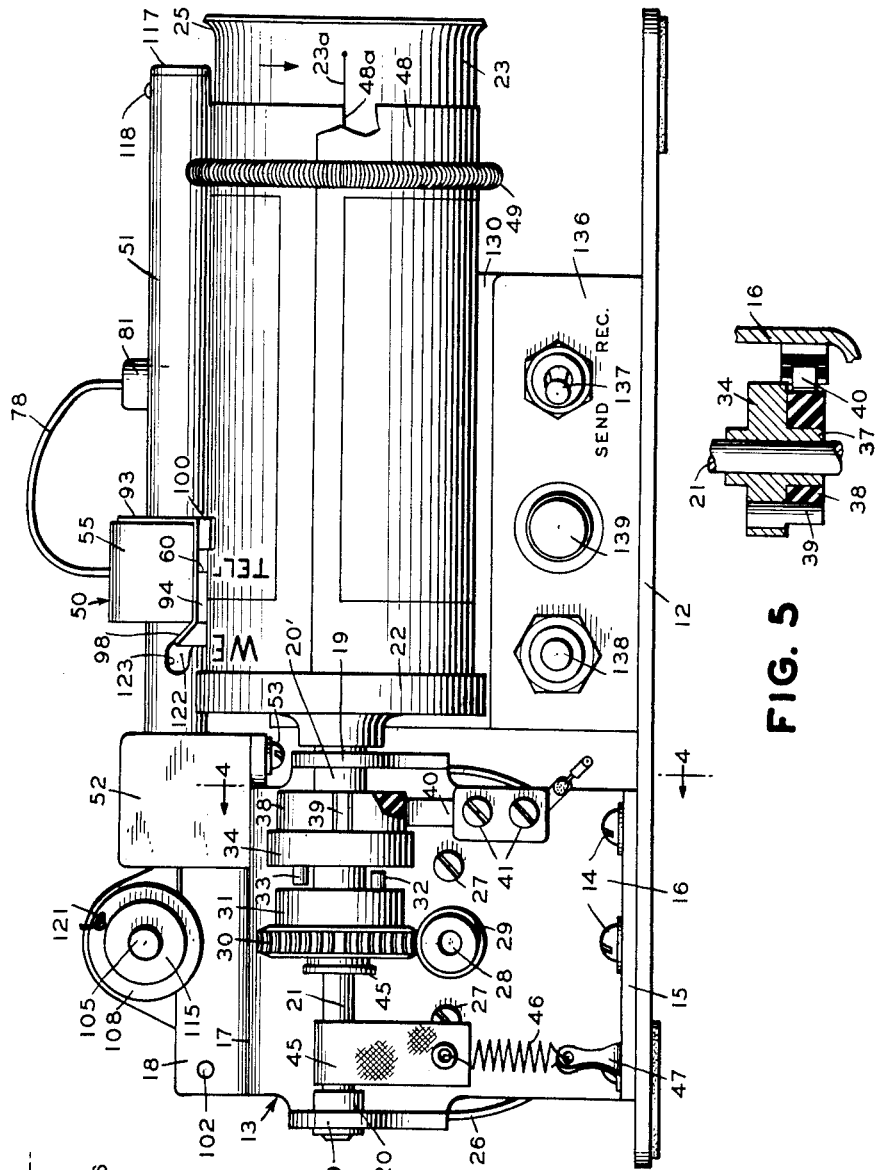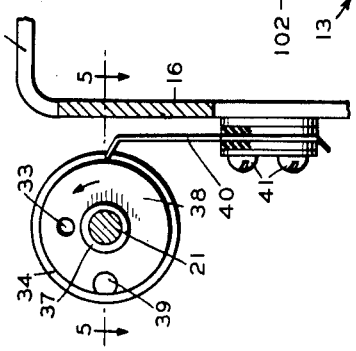

Jan. 24, 1956   G. H. RIDINGS ET AL   2,732,276
FACSIMILE TRANSMISSION SYSTEM AND APPARATUS
Filed June 16, 1948   12 Sheets-Sheet 3
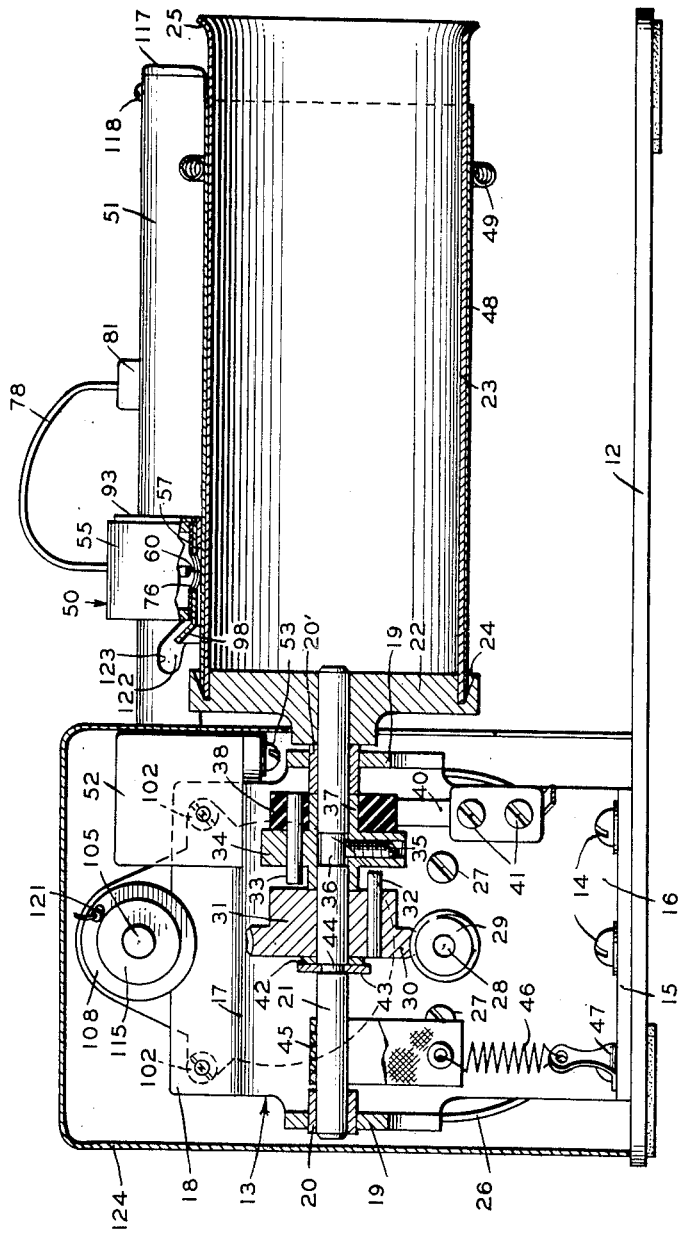
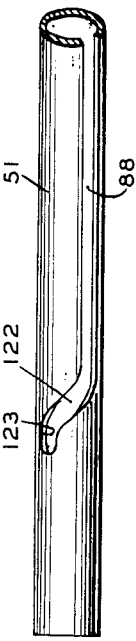
INVENTORS
G. H. RIDINGS
J. H. HACKENBERG
R. J. WISE
G. B. WORTHEN
D. M. ZABRISKIE
BY
A. A. Thomas
ATTORNEY Jan. 24, 1956

G. H. RIDINGS ET AL 2,732,276

FACSIMILE TRANSMISSION SYSTEM AND APPARATUS

Filed June 16, 1948

INVENTORS
G. H. RIDINGS
J. H. HACKENBERG
R. J. WISE
G. B. WORTHEN
D. M. ZABRISKIE

BY A. H. Thomas

ATTORNEY

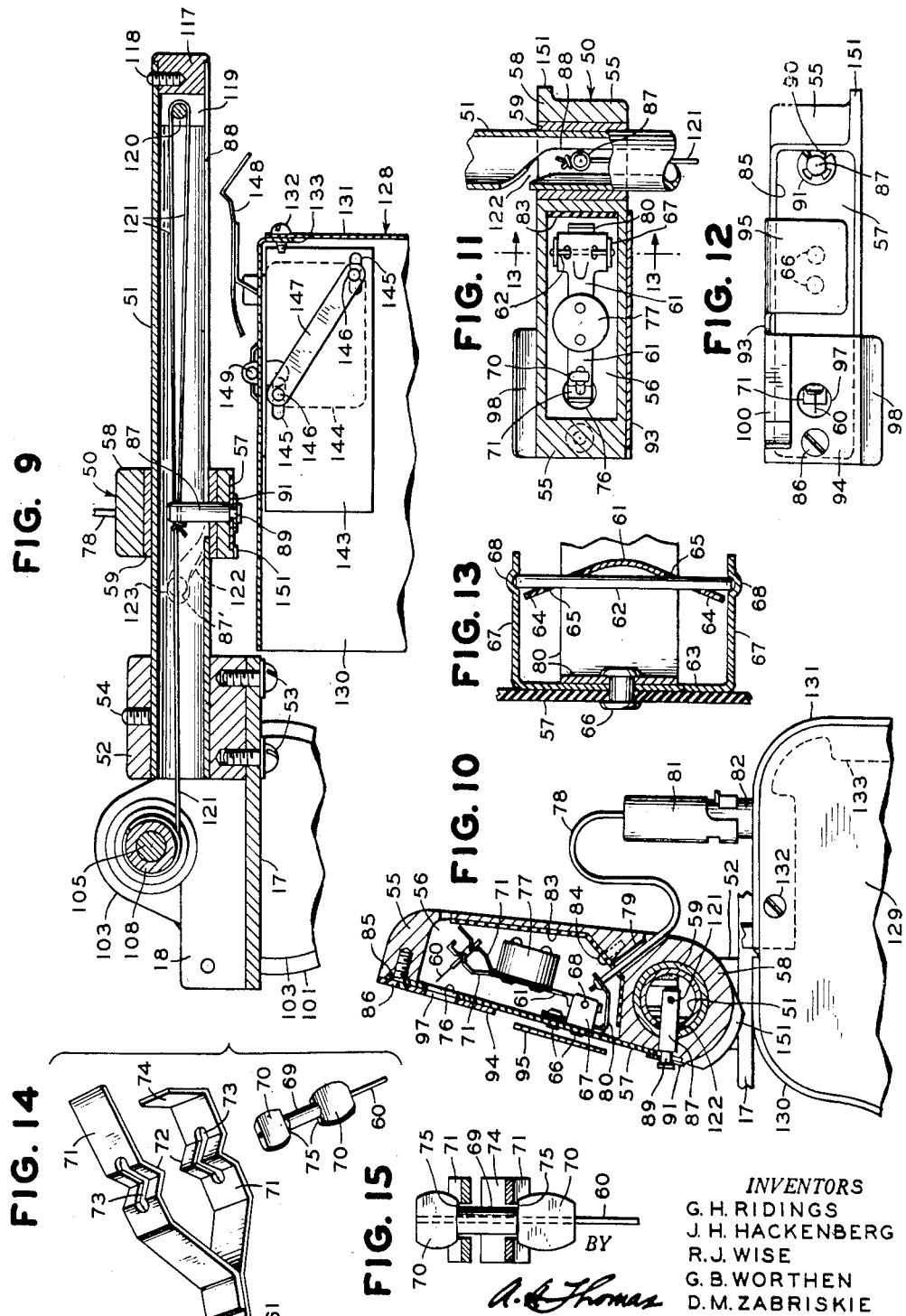

Jan. 24, 1956  G. H. RIDINGS ET AL  2,732,276
FACSIMILE TRANSMISSION SYSTEM AND APPARATUS
Filed June 16, 1948  12 Sheets-Sheet 6
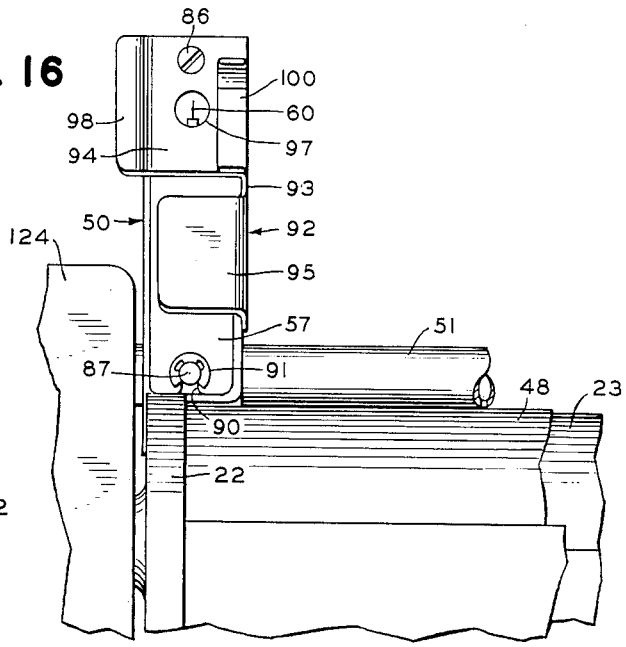
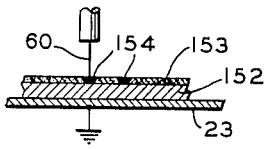
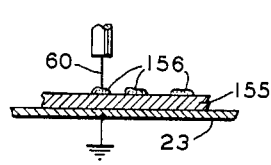
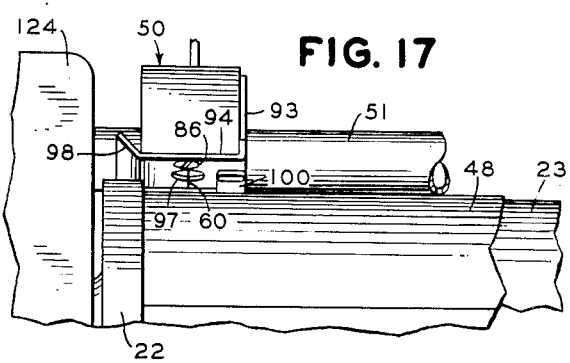
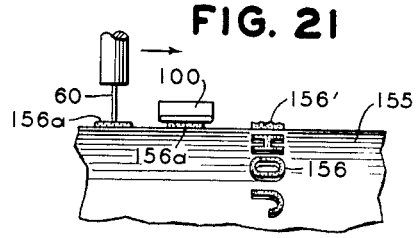
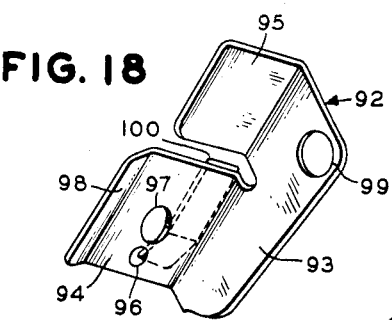
INVENTORS
G. H. RIDINGS
J. H. HACKENBERG
R. J. WISE
G. B. WORTHEN
D. M. ZABRISKIE
BY
A. H. Thomas
ATTORNEY

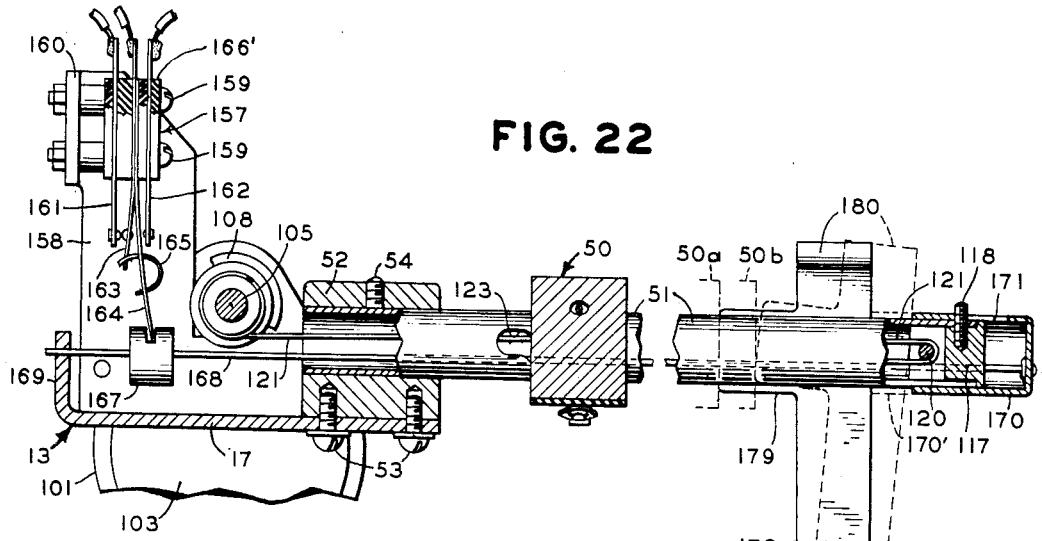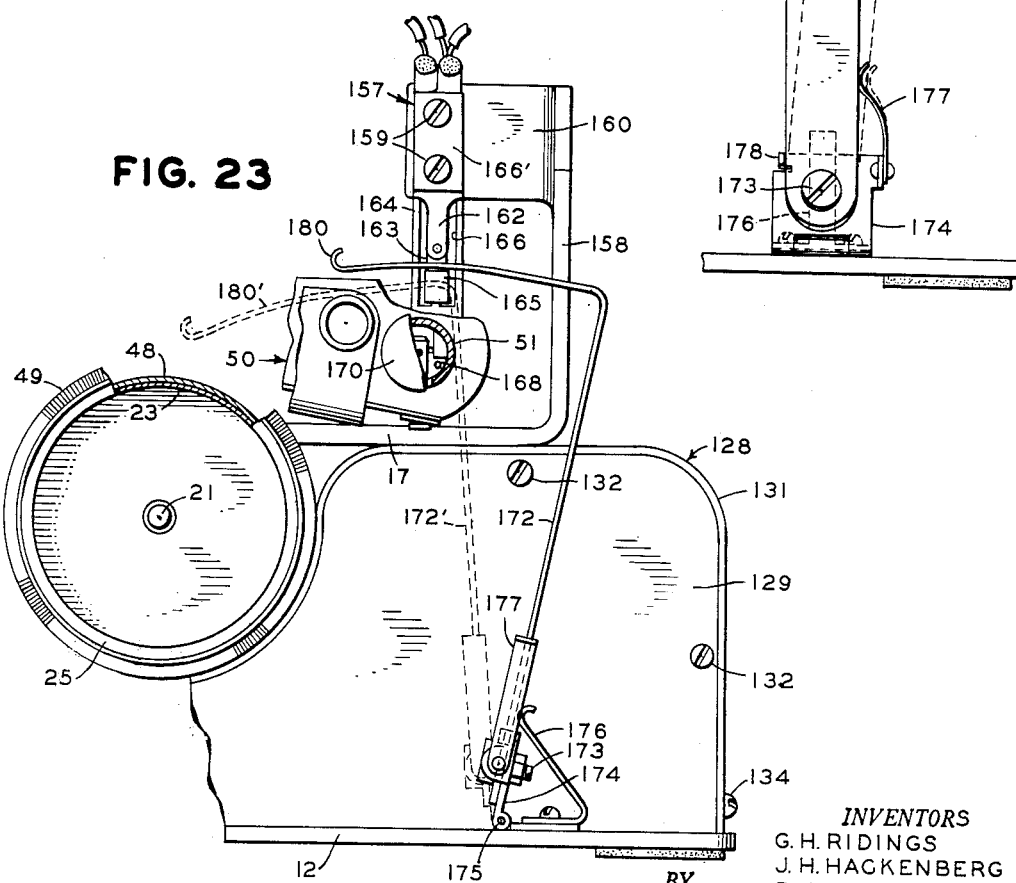

Jan. 24, 1956 G. H. RIDINGS ET AL 2,732,276
FACSIMILE TRANSMISSION SYSTEM AND APPARATUS
Filed June 16, 1948 12 Sheets-Sheet 8
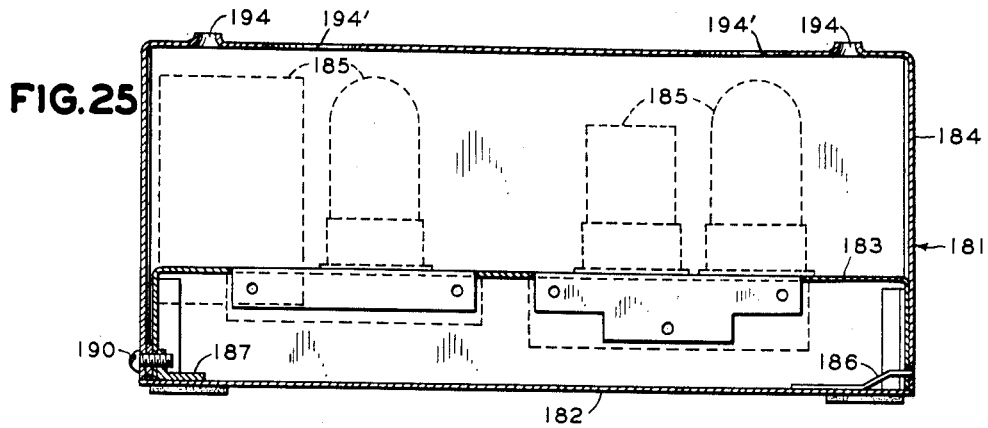
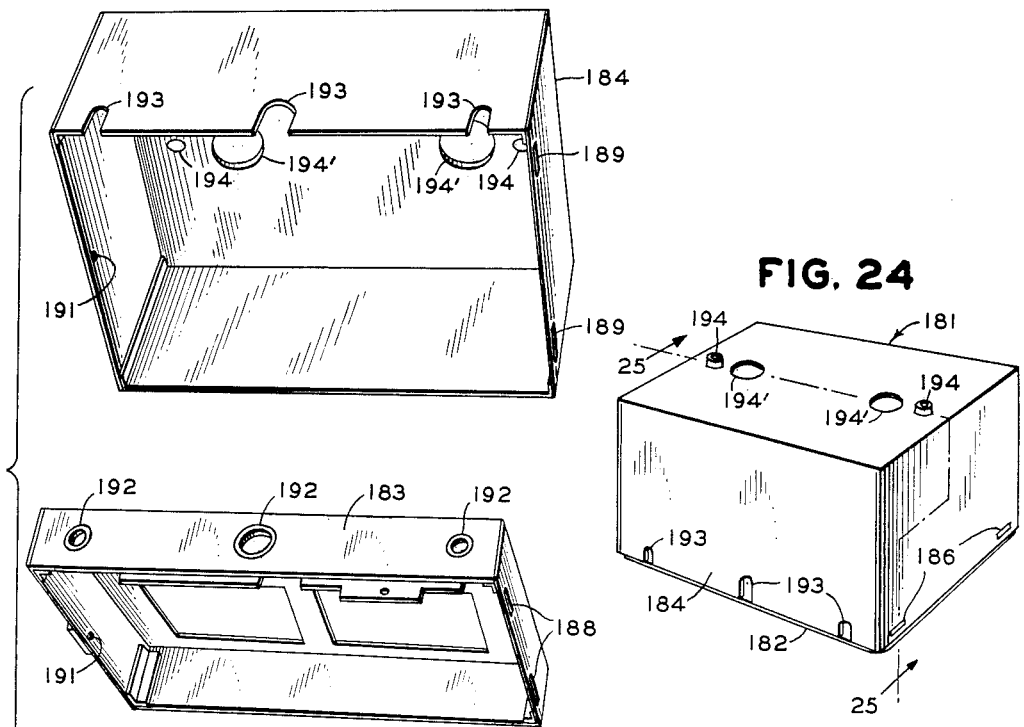
INVENTORS
G. H. RIDINGS
J. H. HACKENBERG
R. J. WISE
G. B. WORTHEN
D. M. ZABRISKIE
BY
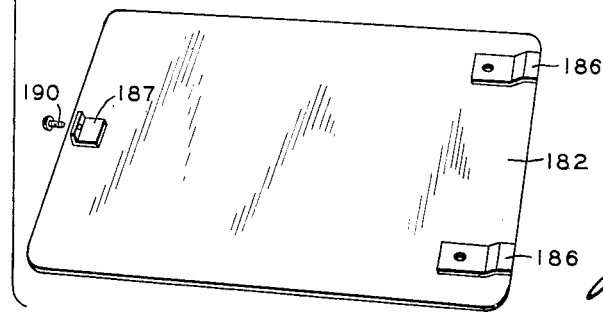
ATTORNEY

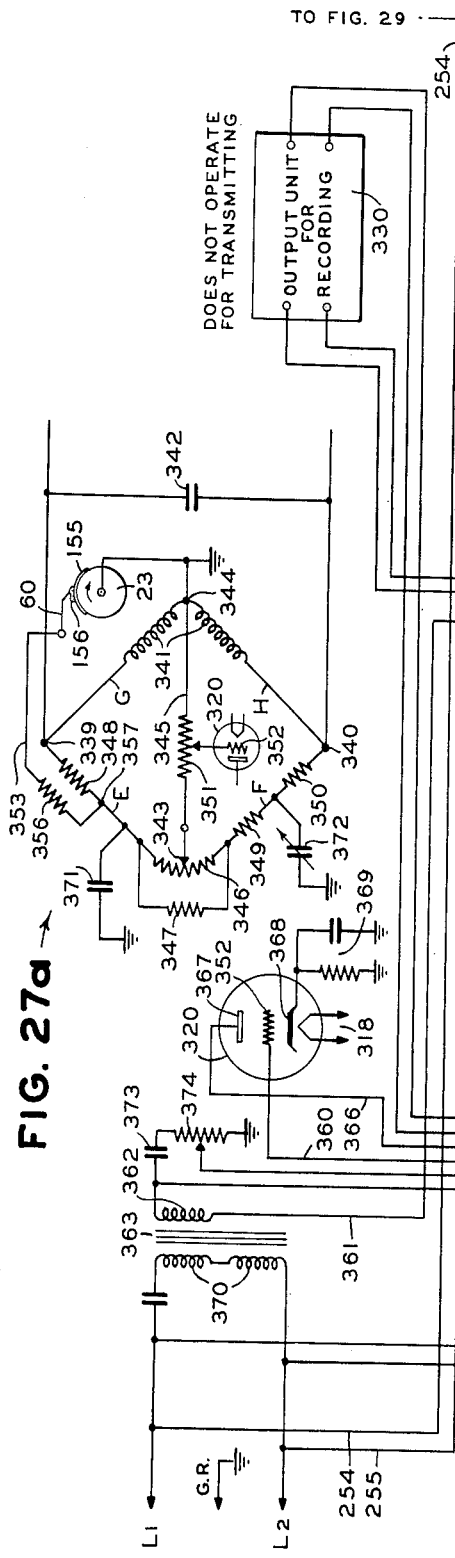

Jan. 24, 1956 — G. H. RIDINGS ET AL — 2,732,276
FACSIMILE TRANSMISSION SYSTEM AND APPARATUS
Filed June 16, 1948 — 12 Sheets-Sheet 10

INVENTORS
G. H. RIDINGS
J. H. HACKENBERG
R. J. WISE
G. B. WORTHEN
D. M. ZABRISKIE
BY A. A. Thomas
ATTORNEY

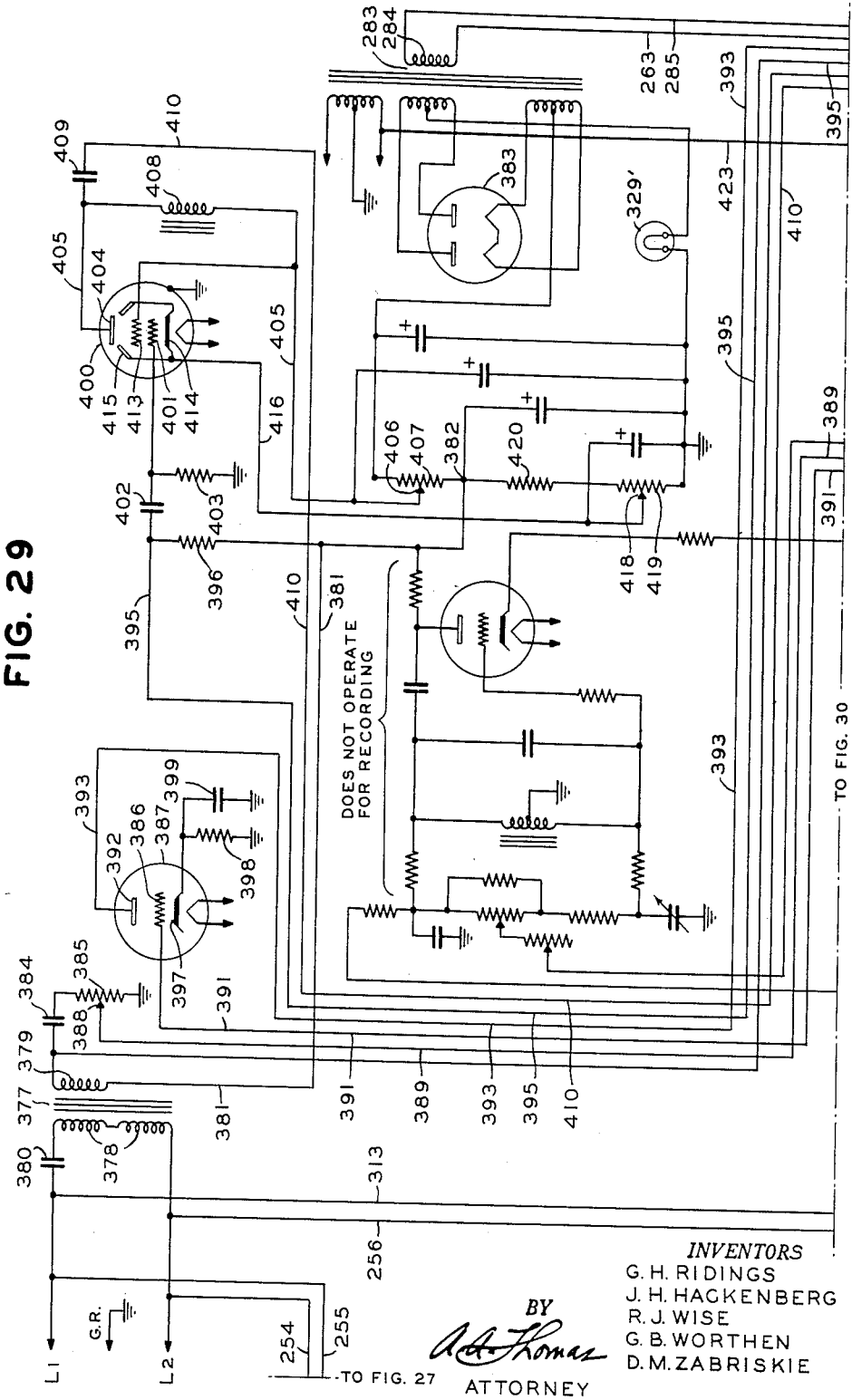

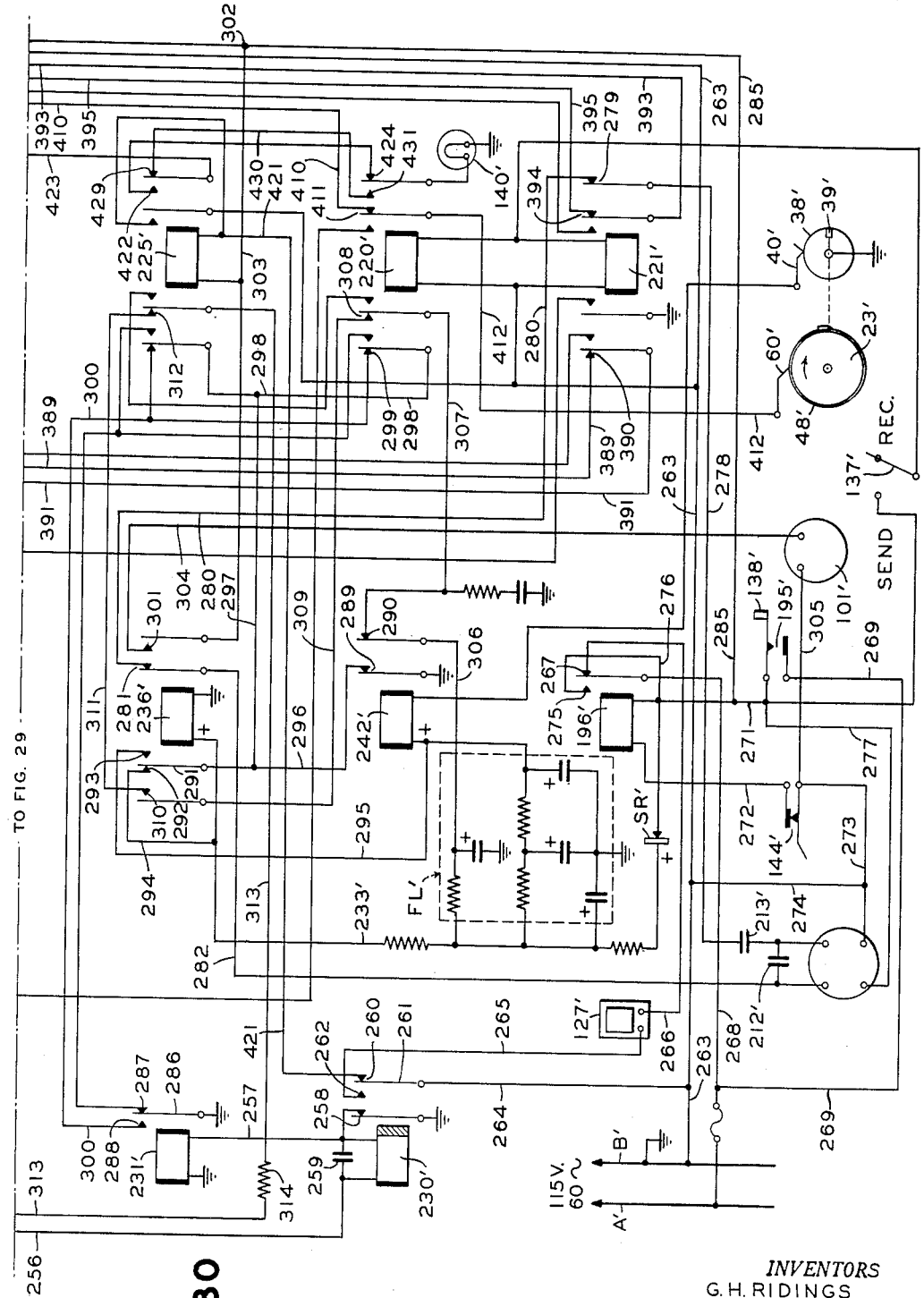

United States Patent Office 2,732,276
Patented Jan. 24, 1956

2,732,276

FACSIMILE TRANSMISSION SYSTEMS AND APPARATUS

Garvice H. Ridings, Summit, N. J., John H. Hackenberg, Flushing, N. Y., Raleigh J. Wise, Arlington, N. J., George B. Worthen, New York, N. Y., and Douglas M. Zabriskie, Northvale, N. J., assignors to The Western Union Telegraph Company, New York, N. Y., a corporation of New York Application June 16, 1948, Serial No. 33,354

19 Claims. (Cl. 346—139)

This invention relates to the art of facsimile transmission and its general object is to provide a simple, compact machine of the stylus type adapted to operate equally well for transmitting and recording. Our new facsimile machine is primarily designed for light duty in small business houses and other commercial establishments where expensive apparatus would not be justified. Accordingly the chief purpose of our invention is to get up a transmitter-recorder of low first cost and cheap maintenance for mass production and distribution with the additional advantage of requiring minimum attention and no skill in using it.

Briefly stated, the novel mechanism of our machine in its preferred form comprises a scanning drum rotated by a synchronous motor, a small carriage slidable on a tube parallel with the drum and carrying a stylus, and a line for operating the carriage in scanning position. This lines goes inside the tube where it is connected to the carriage, and a reel operated by another synchronous motor winds up the line to feed the stylus slowly over the sheet on the rapidly revolving drum. At the end of a scanning operation the machine stops itself. The carriage is returned manually from final to start position by simply pushing it with the finger along the tubular track. As it nears the start position, the carriage automatically rises and remains in lifted rest position, leaving the drum unobstructed for loading and unloading. Conversely, when the stylus carriage starts moving forward, it automatically drops to scanning position.

The machine is so simple to use whether as transmitter or recorder that an unskilled office clerk can do it. There are only two manual controls, a start button and a send-receive switch. For transmitting the attendant loads a message sheet on the drum, moves the switch to "Send" position and pushes the start button. From there the machine takes care of itself. Similarly, when using the machine as a receiver, the attendant places a recording blank on the drum, throws the switch to "Receive" position and presses the start button.

For each machine we provide an amplifier and control unit contained in a small casing and electrically connected with the machine. This casing may be separate from the machine or it may form the base of the machine itself, thereby adding to the compactness of the apparatus as a whole. Each electrical unit is equipped to operate for transmitting and receiving. Such parts in the unit as function only for transmitting are automatically cut out for recording, and vice versa.

Two distant machines are placed in facsimile communication through a pair of cross-connected lines over which the control and signal circuits operate. When the attendant at the transmitter pushes the start button, the drum starts rotating and a buzzer at the receiver calls the attendant who then loads his drum with a blank and presses the start button. The operation of this button at the receiver puts power on the receiver, automatically causes the drums of the two machines to phase, and starts the scanning carriage at the transmitter.

The automatic phasing of the two machines is accomplished by a novel method which involves the drifting of one drum motor with respect to the other until the proper phase relationship is established between the two rotating drums. This phasing apparatus is so simple that it contributes to the economy of the machine both as to space and cost.

Since our machine is inherently capable of transmitting and recording, we include certain safety features to guard against the improper use of the machine. Thus, if a machine is to transmit a message and is accidentally set up as a recorder, a signal light will appear to warn the attendant, and if he should operate the start button under that condition, the receiver at the other end of the line will not be called. Similarly, if a machine is set up as a transmitter after a call has been received, a signal light will apprise the operator of the wrong set-up and he will throw his switch to the proper position.

Our machine and system can be set up to work equally well from a transmitting copy composed of insulating characters on a conducting sheet or a copy with conducting characters on an insulating sheet. Further, it is immaterial whether the original message is a positive copy (black on white) or a negative copy (white on black). It is only necessary that the characters and the paper have different electrical resistances. In either case the recorder will make a positive copy due to the fact that signals are sent to the line only when the transmitting stylus scans the characters on the sheet. However, our system can be adjusted to send out signals when the transmitter stylus scans the background of the sheet.

In the practical application of our invention, two machines can be connected for a point to point service, as from the main office of a commercial house to each of its branches, or a customer's machine can be connected with the main telegraph office for the quick pickup and delivery of telegrams. In the first instance the home office of a business can telegraph directly to its branches, and in the other case a telegram to anywhere can be facsimiled directly to the main office for dispatch to its destination. This arrangement not only dispenses with the old-fashioned call boxes previously installed in business offices to summon a telegraph boy, but it also enables the main office to transmit a received telegram instantly to a customer's machine.

The novel features and practical advantages of our invention will be fully understood from a description of the accompanying drawings which illustrate a commercial form of our facsimile machine and system as actually used. In these drawings:

Fig. 1 shows a plan view of our transmitter-receiver;
Fig. 2 is a sectional detail on line 2—2 of Fig. 1;
Fig. 3 represents a front view of the machine;
Fig. 4 is a section on line 4—4 of Fig. 3;
Fig. 5 is a section on line 5—5 of Fig. 4;
Fig. 6 shows a longitudinal section through the machine on line 6—6 of Fig. 1;
Fig. 6a shows the carriage track by itself;
Fig. 7 is a left end view of the machine;
Fig. 8 is a right end view partly in section;
Fig. 9 shows a section through line 9—9 of Fig. 1;
Fig. 10 shows a sectional view of the stylus carriage in vertical or rest position;
Fig. 11 is a section through the stylus carriage on line 11—11 of Fig. 8;
Fig. 12 is a bottom view of the detached carriage;
Fig. 13 is an enlarged section on line 13—13 of Fig. 11;
Fig. 14 shows the stylus and its mounting ready for assembly, this perspective view being greatly exaggerated for clearness;

Fig. 15 is an enlarged section on line 15—15 of Fig. 8 showing the parts of Fig. 14 in assembled condition;

Fig. 16 is an enlarged fragmentary view showing the stylus carriage in raised position;

Fig. 17 is similar to Fig. 16 with the carriage lowered but not yet resting on the drum;

Fig. 18 is a detached perspective of the foot plate attached to the stylus carriage;

Figs. 19 and 20 represent exaggerated diagrammatic views of two kinds of copy sheets prepared for transmission;

Fig. 21 illustrates how wax characters on a subject copy are smoothed down by the stylus carriage;

Figs. 22 and 23 show a modification of our machine in regard to certain switch operating mechanism;

Fig. 24 is a perspective of the casing which encloses the electric parts of the amplifier and control unit connected to the machine;

Fig. 25 shows a section on line 25—25 of Fig. 24;

Fig. 26 shows the main mechanical parts of the electric unit before assembly;

Figure 28:
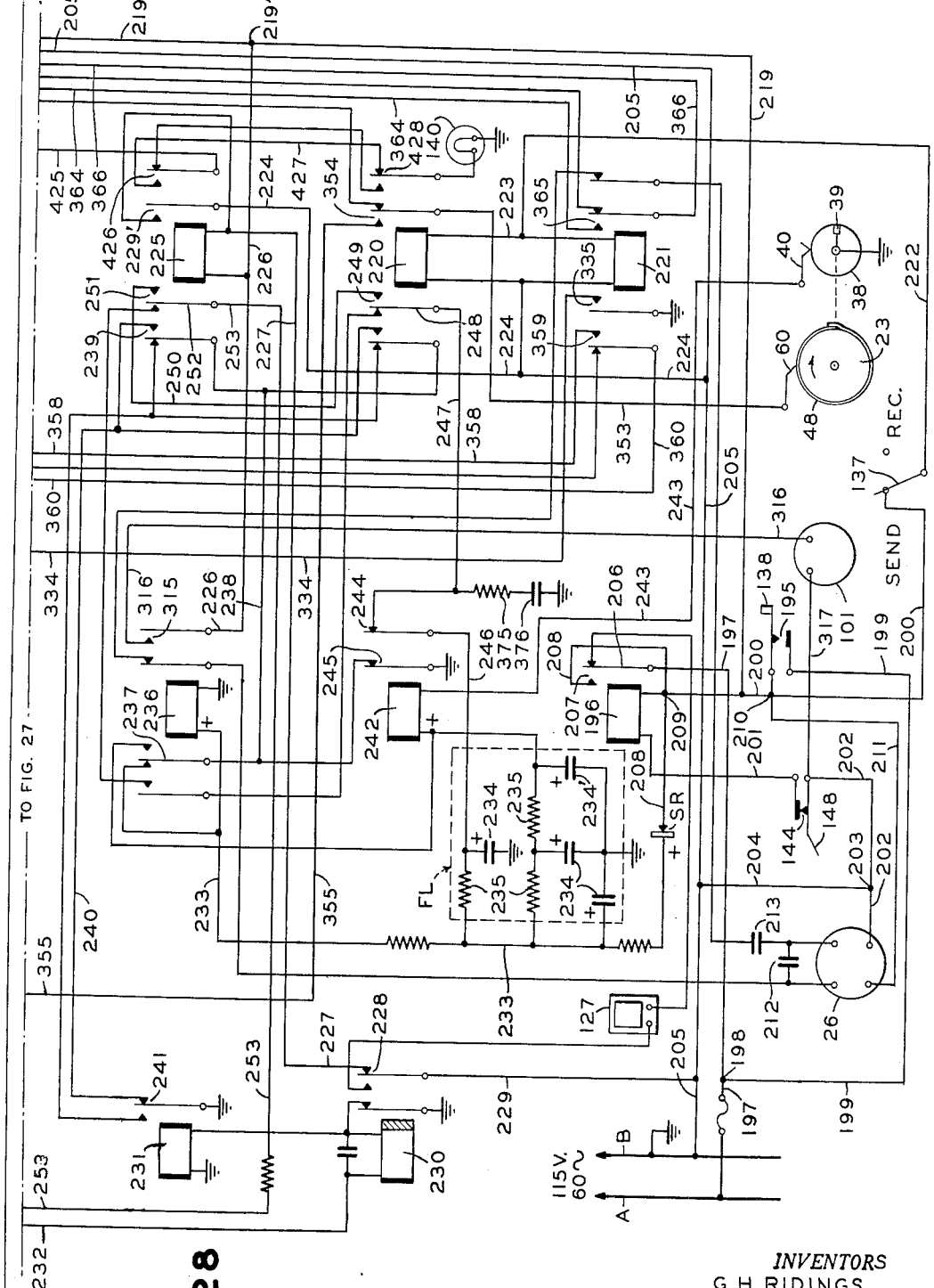

Figs. 27 and 28 together illustrate the control and amplifier circuits of the machine when used as a transmitter;

Fig. 27a shows separately a bridge network included in Fig. 27; and

Figs. 29 and 30 show the circuits when the machine operates as a receiver.

The entire mechanism of our machine is mounted on a small base plate 12 on which a main supporting bracket 13 is secured by screws 14. The bracket 13 is preferably a single piece of heavy sheet metal (Fig. 7) shaped to provide a bottom flange or shoe 15 through which the screws 14 pass, an upright plate 16, a horizontal top plate 17 and a vertical end flange 18. The upright plate 16 has a pair of side lugs 19 extending forward and provided with bearings 20 and 20' in which a rotary shaft 21 is journalled. The right end of shaft 21 carries a disk 22 (Fig. 6) to which a scanning drum 23 is secured. The drum 23 is a length of metal tubing with one end held tight in a groove 24 of disk 22. The other end of drum 23 is left open and flares out to form a flange 25. The open drum also serves as a storage receptacle for extra blanks.

A small synchronous motor 26 (Fig. 7) is secured to the back of the vertical plate 16 beneath the top 17 of bracket 13. The shaft 28 of this motor extends forward to a hole in plate 16 and carries a worm 29 which is permanently in mesh with a worm gear 30 rotatably mounted on shaft 21. The gear 30 has a hub 31 for increased bearing surface and carries a coupling pin 32 arranged to engage a similar pin 33 projecting from a metal disk 34. This disk is fixed on the drum shaft 21 by a set screw 35 which extends into an annular groove 36 of the shaft, whereby the radial position of the disk can be adjusted. When the motor starts to run, the shaft 21 remains stationary until the pin 32 strikes the pin 33 and thereby couples the drum 23 to the motor. When the motor is not running, the drum is free to be turned by hand for nearly one revolution. The purpose of this free movement of the drum will be explained later.

The metal disk 34 has a hub or sleeve 37 (Figs. 5 and 6) on which a phasing commutator ring 38 is mounted. The pin 33 connects the parts 34 and 38 to form a unit secured to shaft 21 and always rotatable therewith. The commutator 38 is a ring of insulating material carrying a contact 39 which is shown in the form of a pin that passes through the assembled parts 34 and 38. The ring 38 is originally of the same size as the disk 34 and is then turned down to expose the metal pin 39 as a contact on the periphery of the insulating commutator ring. This will be clear from Figs. 4 and 5. The contact 39 also acts as a pin to assist in holding the parts 34 and 38 together.

An insulated conductor brush 40 always bears against the commutator 38 (Fig. 4) and engages the contact 39 once for every revolution of the drum shaft 21. The brush 40 is attached to the vertical bracket plate 16 by screws 41. Since the contact 39 is always grounded to the metal frame of the machine, the brush 40 is grounded momentarily every time it touches that contact. The angular position of contact 39 with respect to the drum 23 is adjusted by means of the set screw 35. The part 38 is called the phasing commutator because it controls the automatic phasing of two connected machines, as will be explained in the description of the circuits shown in Figs. 27 to 30.

Referring to Fig. 6, it will be seen that the shaft 21 is held against axial displacement by the fixed bearing 20' in the supporting bracket 13. The worm gear 30, which is free to turn on the shaft 21, is locked against shifting by a thrust washer 42 and a retaining ring 43 which is caught in a groove 44 of the shaft. A suitable brake 45 acts as a constant load on shaft 21 and thereby holds the meshing gears 29 and 30 in firm driving contact. In the present instance the brake 45 is a strip of canvas webbing looped around shaft 21 and pulled down by a contractile spring 46 attached to a lug 47 on base plate 12, as shown in Figs. 3, 6 and 7.

The drum 23 is a little longer than the width of the sheet 48 to be mounted thereon for scanning either to transmit or to receive. For transmitting the sheet 48 constitutes the subject copy (such as a telegram) and for receiving it is a blank of electrosensitive paper on which the transmitted message is recorded in facsimile. The sheet is held on the drum 23 by the left end entering the retaining groove 24 in ring 22 (Fig. 6) and a spring garter 49 keeps the right hand portion of the sheet in place. The garter 49 is made of fine coiled wire and rolls easily over the paper. The flaring flange 25 holds the garter against slipping off the drum.

A stylus carriage 50 is slidably mounted on a fixed track 51 which is shown as a metal tube supported parallel to the scanning drum 23. As shown in Fig. 9, the left end of tube 51 is mounted in a block 52 which is secured to the top plate 17 of bracket 13 by bottom screws 53, and a set screw 54 locks the tube in place. Referring to Figs. 8 and 10, the carriage 50 is a small narrow casing composed of a hollow casting 55 which provides a chamber 56 closed at the bottom by a cover plate 57 of insulating material. The casting 55 has a rear base portion 58 with a cylindrical hole in which a bearing sleeve 59 is tightly fitted to slide over the tube 51. In this way the carriage 50 is mounted on tube 41 for easy slidable as well as pivotal movement.

A stylus 60 is mounted in the chamber 56 of carriage 50 for scanning a sheet on drum 23 either to transmit or to receive. Referring to Figs. 11 and 13, the stylus mounting comprises a spring metal arm 61 which carries a cross-pin 62 at its rear end for pivotal support on a clip 63. The pivot pin 62 is frictionally held on the arm 61 by lateral extensions 64 which are curved to allow passage of the pin through holes 65. These curved extensions or wings act like tensioned spring plates which tend to flatten out and thus clamp the pin 62 rigidly to arm 61 without the need of separate fastening means.

The clip 63 is secured by rivets 66 to the cover plate 57 and has a pair of upstanding lugs 67 in which dimples 68 are formed to receive the ends of cross-pin 62. The lugs 67 are slightly sprung apart to receive the pin 62 which therefore engages the dimples 68 in constant pressure contact. It will thus be seen that the stylus arm 61 is mounted on a simple spring support which is self-adjusting so that the arm is held to a pin-point accuracy in its pivotal movements and can not become loose or wobbly. It should also be noted that the constant pressure between the pin 62 and the dimples 68 forms a good electric contact between the stylus arm 61 and the supporting clip 63.

Referring to Figs. 14 and 15, the stylus 60 is a short wire, such as steel or tungsten, held in a small tube or nib 69 which is flattened at the ends to form locking keys 70. The free end of arm 61 terminates in a pair of spring fingers 71 which are formed with transverse V-shaped grooves 72 and provided with longitudinal slots 73. A lateral extension 74 on one of the fingers limits their movement toward each other. To attach a stylus to arm 61 it is only necessary to squeeze the fingers 71 together, insert the flat keys 70 through the slots 73, then turn the nib 69 through a right angle. Upon release of the spring fingers 71 the V-shaped grooves 72 press outward against the shoulders 75 of keys 70 (Fig. 15) and thereby lock the stylus securely in place. This construction permits a quick and easy removal and replacement of a stylus without the need of tools.

When the carriage 50 is in horizontal or scanning position (Fig. 8) the stylus 60 extends through a hole 76 in the bottom cover 57 into contact with the sheet 48 on drum 23. In this position the stylus slants forward in the direction of rotation. The scanning pressure on the tip of the stylus is determined by a weight 77 mounted on the top of arm 61. When the carriage 50 is thrown back into vertical rest position (Fig. 10) the weight 77 automatically swings the stylus arm 61 rearward on its pivot pin 62 and thereby withdraws the stylus 60 entirely into the chamber 56. This safety position of the stylus guards the operator against accidentally scratching his hand on the sharp stylus tip.

The stylus 60 is connected in the scanning circuit of the machine by a flexible lead 78 which enters the carriage through a hole 79 (Figs. 8 and 10) and is joined at its inner end to a contact 80. This contact is a right angled strip secured to the top of clip 63 by the rivets 66. The outer end of conductor 78 is attached to a suitable coupling member 81 which is detachably mounted on a plug 82 for connection with a wire inside the machine. For the present we need not go any further into the stylus circuit. The conductor 78, which is a permanent part of the carriage assembly, is sufficiently long and flexible to allow free movement of the carriage.

Attention is called to the fact that the stylus support is completely insulated by the cover plate 57 on which it is mounted. When the carriage 50 is thrown back, the stylus arm 61 rests at its tip against an insulating strip 83 secured to the casing 55 by a pin 84. The stylus 60 is thus always insulated from the carriage 50. Since the carriage is always at ground potential, the insulating strip 83 may be dispensed with. The insulating cover 57 is preferably seated in a shallow recess 85 at the bottom of casting 55 so as to be flush with the lower edge thereof, as shown in Figs. 9 and 12.

The cover plate 57 is removably attached to the casting 55 by a screw 86 at the front and by a pin 87 at the rear. The pin 87 is rigidly mounted in the bearing portion 58 of casting 55 and extends into the supporting tube 51 through a longitudinal slot 88 (Fig. 9). The outer end of the pin 87 has a neck 89 adapted to receive the forked rear end of the cover plate 57 (Fig. 16). A spring clip 91 is snapped over the neck 89 to hold the forked end of the cover plate firmly in place. By simply removing the screw 86, the cover plate 57 can be slipped off the pin 87, so that the entire stylus mounting is exposed for inserting a new stylus. The flexible lead 78 slides in the hole 79 when the cover 57 is taken off the carriage.

On the bottom of carriage 50 is a right angled foot plate of sheet metal indicated as a whole by 92 (Fig. 18). This plate is shaped to have a side 93 and two spaced bottom pieces 94 and 95. The front bottom piece 94 has a small hole 96 for the screw 86 and a large hole 97 for the stylus 60. As seen in Fig. 8, the two stylus holes 76 and 97 at the bottom of the carriage are in register. The free edge of bottom piece 94 is turned up to form a sloping flange 98 which performs a special function to be described later.

When the foot plate 92 is mounted on the carriage 50, it is held against lateral displacement by the side members 93 and 98 (Fig. 17), so that the single screw 86 is sufficient to fasten the foot plate to the stylus carriage. The sole function of the bottom piece 95 is to protect the operator from touching the rivets 66 which are in a high voltage circuit. As seen in Fig. 8, the guard piece 95 is spaced from the rivets 66 and acts as a cover for them. A large hole or depression 99 in the side 93 of the foot plate serves as a finger rest when the operator pushes the carriage left toward starting position.

As seen in Figs. 16 and 18, the foot plate 92 has a shoe 100 attached to the bottom piece 94 and so arranged as to ride over the sheet on drum 23 ahead of the stylus 60. The shoe 100 is a smooth metal strip preferably bent to conform to the drum curvature (Fig. 7) so as to engage the sheet along a wide area and hold it firmly pressed down for scanning. The weight of carriage 50 is thus supported by the shoe 100 which thereby allows the pin 87 to slide freely in the longitudinal slot 88 of tube 51.

We shall now describe the mechanism for sliding the stylus carriage 50 along the track 51 for scanning, reference being had to Figs. 1, 2 and 7. A small synchronous motor 101, which we call the stylus motor, is attached to the rear flange 18 of bracket 13 by screws 102. The motor 101 has a gear casing 103 from which a driving shaft 104 extends forward, this shaft being connected to the motor shaft through a high reduction gear so as to turn very slowly. Referring especially to Figs. 1 and 2, the driving shaft 104 carries a clutch shaft 105 which has a hub 106 seated on the end of shaft 104 and secured by a set screw 107.

A reel 108 is rotatably mounted on clutch shaft 105 between a pair of friction washers 109 and 110 which are usually of felt or like material. A conical disk 112 forms a rigid cam abutment for a circular contractile spring 113 which presses against a metal ring 114 adjacent to the friction washer 109. The other washer 110 bears against a collar 115 fixed at the outer end of shaft 105 by a set screw 116. It is clear from Fig. 2 that the coil spring 113 always tends to ride down the cam surface of disk 112 so that it holds the friction washers 109 and 110 constantly pressed against the opposite sides of reel 108. In other words, the parts mounted on shaft 105 constitute a friction clutch for connecting the reel 108 with the stylus motor 101. The parts 105, 106 and 112 may consist of one piece of metal. Any other practical kind of clutch may be used for releasably connecting the reel 108 to the motor 101.

The reel 108 operates the stylus carriage 50 through the following connections which are best shown in Fig. 9. The outer end of tube 51 is closed by a cap 117 which is held in place by a screw 118. The cap 117 has a slotted extension 119 (Fig. 1) for supporting a roller 120. A line 121 is attached at one end to clutch reel 108 and at the other end to the carriage pin 87. This line extends from the reel into the tube 51 where it passes over the roller 120 to the carriage pin 87. As will be clear from Fig. 9, the clockwise rotation of reel 108 winds up the line 121 which pulls the carriage 50 uniformly along the track 51 toward the right. The pin and slot arrangement 87—88 helps to assure the rectilinear movement of the stylus carriage along its track. It is hardly necessary to explain that the term "line" is applied to the element 121, both here and in the claims, is used in its broadest sense possible to include any kind of flexible connection suitable for the purpose such as, cord, string, tape, wire, chain, and the like.

The longitudinal slot 88 in tube 51 terminates at its left end in a cam-shaped offset 122 which turns upward (Fig. 6a). As will be evident from Fig. 9, when the carriage 50 is pushed leftward on track 51, the pin 87 will ride up in cam slot 122 so that the carriage is automatically lifted off the drum to rest position (Fig. 10). The end of cam slot 122 forms a flat stop shoulder 123 against which the pin 87 rests to support the carriage in upright or starting position. The dotted circle 87' in Fig. 9 indicates the horizontal position of pin 87 when the carriage is thrown back. When we speak of the vertical or upright position of the carriage, we do not mean a position ninety degrees from the horizontal, for the carriage may be held at any other suitable angle to clear the drum for loading and unloading.

Assuming the carriage 50 to be in upright position at the extreme left, the moment it starts moving to the right by the operation of reel 108, the pin 87 is turned by slot 122 from horizontal to vertical (compare Figs. 10 and 8) and the carriage is automatically lowered to scanning position. That is to say, the mere starting of stylus motor 101 automatically moves the stylus 60 to operative position on drum 23. Conversely, when the operator returns the carriage to its starting point, the cam slot 122 automatically lifts it off the drum and holds it in upright position until the motor 101 starts again. During the return movement of the carriage the line 121 is unwound from reel 108 which is free to turn backward by virtue of its frictional coupling to the clutch shaft 105.

The flange 98 on the foot plate 92 is arranged to engage the end ring 22 of drum 23 as the carriage 50 descends from initial to scanning position (compare Figs. 16 and 17). Whether the carriage is lowered by operation of motor 101 or is accidentally released by the attendant, it will drop suddenly until the flange 98 encounters the edge of ring 22, and this happens before the shoe 100 strikes the drum 23 (Fig. 16). The rest of the descending movement of the carriage takes place slowly as the flange 98 slides off the ring 22. This not only causes the carriage to land quietly on the drum but also prevents damage to the stylus. Other means than the ring 22 can be arranged in the path of foot plate 92 to let the carriage down gently on the drum.

Referring to Figs. 1, 6 and 7, a housing 124 preferably of sheet metal covers the main supporting bracket 13 and the various parts mounted thereon so that the motors 26 and 101 together with their driving connections are completely enclosed. This housing is removably attached to the base 12 in any practical way, as by screws 125 engaging a pair of small lugs 126. The right side of the housing is cut away, as indicated at 124' in Fig. 7, to accommodate certain parts of the machine. To enhance the appearance of the machine the housing 124 is made of attractive design and color. We further utilize the space inside the housing to conceal a buzzer 127 which is carried by a bracket 127' mounted on base 12. This buzzer is operative only when the machine is used as a receiver and serves as a call signal for the attendant, as will be explained later.

To the right of motor housing 124 is a casing 128 which is mounted on base 12 and provides a chamber for enclosing various small electrical parts of the machine. The casing 128 consists of a side piece 129, a front cover 130 and a back cover 131, all preferably of sheet metal. The parts 129 and 130 are permanently united as one piece to which the back cover 131 is removably attached by screws 132. These screws pass through a side flange 133 in cover 131 and a bottom screw 134 secures the cover to a bracket 135 on base 12. The back cover 131 carries the plug 82 on which the connector 81 is mounted. It will be seen that the back cover 131 can be removed for access to the inside of casing 128 without disturbing the front cover 130.

Referring to Fig. 8, the front cover 130 is curved concentrically with drum 23 and arranged close thereto so as to form a guide for a sheet to be mounted on the drum. The front part of cover 130 forms an upright panel 136 beneath the drum (Figs. 3 and 8) and this front panel supports a send-receive switch 137, a start button 138 and a colored jewel 139 for a warning lamp 140 mounted behind the panel. A horizontal flange 141 on the bottom panel 136 receives screws 142 for securing the front cover 130 to the base. As will be explained later, the jewel 139 lights when the machine is set up for the wrong operation.

As shown in Figs. 8 and 9, the rear end of the front cover 130 carries a depending plate 143 on which a suitable switch 144 is mounted in any practical way. To make the switch adjustable lengthwise on plate 143 we provide the latter with longitudinal slots 145 for receiving screws 146 which connect with a diagonal bar 147. These screws pass through the switch casing and clamp the bar 147 against the back of plate 143, whereby the switch 144 is held in adjusted position. For distinction we shall designate the part 144 as the end-of-message switch because it operates at the end of a scanning operation.

The switch 144 is a standard device obtainable in the market, such as a microswitch of well known construction. We need only mention that the switch is operated by a spring arm 148 pivoted to the switch casing at 149. The back cover 131 has a slot 150 (Fig. 1) for letting the switch arm 148 through. The switch is normally closed and opens abruptly when the arm 148 is pushed down. This arm is arranged in the path of a rear projection 151 on the stylus carriage 50 (Figs. 1 and 8). When the carriage is at the end of its forward travel (that is, after a message has been scanned), the projection 151 depresses the arm 148 and opens the switch 144, whereby the power is turned off and the machine stops. The circuit connections for this operation will be explained in the description of Figs. 27 to 30. The switch arm 148 may also be operated by hand when it is necessary to stop the machine at any time.

Used as a transmitter our machine will operate on a record sheet where the characters and the paper have different electric resistances. For example, in Fig. 19 the message sheet comprises a conducting base stock 152 (such as carbon) which is covered with a thin coating 153 of insulating material. The message is written with a soft graphite pencil which leaves conducting marks 154 on coating 153 and those marks penetrate to the conducting base 152. Therefore, when the stylus 60 touches a mark 154, it establishes a conducting path to the grounded metal drum 23. When the stylus rides over an unmarked area of the sheet, the high resistance of coating 153 is interposed in the stylus circuit.

In the message sheet illustrated in Fig. 20 we have the reverse conditions. That is, the sheet 155 is conducting (say, of black carbon) and the message is typed or written thereon in insulating characters 156 formed of suitable wax material. Here, when the stylus rides over the unmarked carbon surface 155 there is a direct conducting path to the metal drum 23. However, when the stylus touches an insulating character 156, the high resistance of this character separates the stylus from the grounded drum. The background 155 or the characters 156 should be of contrasting colors to make the message easily readable.

We have, then, in either case a message sheet in which the characters and the unmarked background have different resistances and these resistance variations in the stylus circuit are utilized to generate facsimile signals in the transmitter, as will be made clear when we come to the circuit diagrams. At this point we should explain that we do not claim broadly the use of either kind of message sheet for facsimile transmission. Furthermore, the idea of a copy sheet having wax characters impressed on a conducting base, as in Fig. 20, is the invention of Bernard L. Kline as set forth in his patent application Serial No. 5,568, filed January 31, 1948, now Patent No. 2,572,817.

It goes without saying that Figs. 19 and 20 are merely diagrammatic and are greatly exaggerated for clearness.

Operation of the machine

Let us suppose that the machine we have described is to be used as a transmitter. With the carriage 50 in the raised or start position at the extreme left, the operator wraps the prepared message sheet 48 around the drum 23 in the manner illustrated in Fig. 3. That is to say, the heading of the message is to the left and the left hand edge 48a of the sheet is placed along a guide line 23a marked lengthwise on the drum 23. The other edge of the paper overlaps the left edge 48a and the sheet is shifted under the ring 22 to hold the left end in place. The spring garter 49 is then rolled over the lower portion of the message as far as it will go.

With the drum thus loaded the operator throws the switch 137 to "Send" position and pushes the start button 138. This instantly energizes the drum motor 26, and as soon as the connected receiver is in condition to record, the stylus motor 101 is automatically energized, operating the reel 108 to wind up the line 121 and pull the carriage 50 to the right. The cam slot 122 in tube 51 causes the carriage to fall into operative position and the stylus 60 scans the subject copy on the drum.

As the stylus carriage 50 moves uniformly to the right, it rolls the garter 49 along with it, so that the sheet is held tightly wrapped. The shoe 100 presses the paper down in advance of stylus 60, which therefore encounters a smooth firm paper surface all along the sheet. If the scanned message is recorded in waxed characters on a conducting sheet, as previously mentioned, the shoe 100 performs the additional function of smoothing the wax down when it happens to be loose or uneven. This will be clear from Fig. 21 where a wax character 156' is shown with a rough surface. After the shoe has passed over it, this character is packed down even, as indicated at 156a, before it comes under the stylus, whereby a better transmission is obtained.

As is usual in facsimile machines, the drum 23 operates at high speed (say 180 R. P. M.) while the stylus carriage 50 moves slowly along the track 51. In our present machine the movement of the stylus is calculated to transmit a full-length message in two minutes. These figures, of course, are given merely as illustrations.

When the carriage reaches the end of its travel after scanning a full-length message, it opens the switch 144 and disconnects all power from the machine. When transmitting a short message, the operator need not wait until the carriage operates the switch 144 for he can shut down the machine at the end of a short message by simply depressing the switch arm 148 with his finger.

Modifications in Figs. 22 and 23

It will be recalled that in the machine we have described, the operator pushes the start button 138 to set the machine going and the stylus carriage 50 automatically stops the machine at the close of a scanning operation by opening the end-of-message switch 144. In another form of our machine as shown in Figs. 22 and 23, the start button and the end-of-message switch are combined into a single device which is worked by hand to start the machine and is operated by the carriage to turn the power off.

In this construction a switch 157 is mounted on an upright extension 158 of the motor bracket 13 by means of screws 159 which pass through a lateral flange 160 of the extension. The switch 157 consists of two stationary contacts 161 and 162 and a movable spring tongue 163 arranged to engage either contact. The tongue 163 is operated with a snap action by means of a toggle lever 164 through a curved spring 165 which connects the lever with the tongue. The toggle lever 164, which is a flexible spring blade, has an opening 166 to allow free movement of the tongue 163. The spring 165 is under constant tension and snaps the tongue 163 from one position to the other as the lever 164 is moved to either side of the toggle center. The four elements 161 to 164 are supported in the insulating base 166' of the switch assembly.

The free end of lever 164 has a slotted connection with a disk or block 167 fixed on a slidable rod 168 which extends through the carriage tube 51. One end of rod 168 is slidably supported by an upstanding flange 169 on bracket 13 and the other end of the rod is attached to a sleeve 170 fitted slidably over the outer end of tube 51. The set screw 118 which holds the cap 117 in place projects through a longitudinal slot 171 in sleeve 170, whereby the latter has a limited sliding movement on the tube 51. The end sleeve 170 forms a convenient finger piece for operating the rod 168.

As shown in Fig. 22, when the sleeve 170 is pulled out, the spring lever 164 is bent to the right and the spring 165 snaps the tongue 163 against the contact 161. It may be assumed that this is the normal or open condition of switch 157. When the sleeve 170 is pushed in, the toggle lever 164 is bent to the left and the spring 165 snaps the tongue 163 against the contact 162 to close the power circuit of the machine. The tongue 163 remains in either position until the sleeve 170 is operated to move it to the other position. It will be understood that the switch 157 represents any practical form of switch adapted to be operated by the finger piece 170 to turn the electric power for the machine on and off.

The length of sleeve 170 is such that the side of the stylus carriage 50 strikes the inner edge of the pushed-in sleeve as the carriage nears the end of its travel. The sleeve is therefore pushed slowly to the right until the toggle lever 164 snaps the tongue 163 away from contact 162 and opens the switch. This happens as the carriage completes its forward movement in scanning a long message. We thus have a switch controlling member 170 which is manually operable to close the power switch for the machine and which is also operable by the scanning carriage 50 to open the switch at the close of a transmission cycle. Of course, the sleeve 170 can be pulled out by hand at any time when it is necessary to stop the machine.

We further utilize the slidable sleeve 170 to stop the machine after a short message has been scanned; that is, before the carriage 50 completes its full length of travel. For this purpose we provide an arm 172 pivoted at 173 on a bracket 174 which is hinged at 175 to the base 12. The pivot 173 allows the arm 172 to rock laterally (right or left) while the hinge 175 allows the arm to swing forward and back. A stop 176 holds the arm 172 in thrown back position where it remains by gravity, and a light spring 177 holds the arm upright against a stop 178 on bracket 174.

The arm 172, which can be cut from a piece of sheet metal, has a lateral extension 179 and a forward extension 180. When the arm 172 is thrown back, as shown in full lines in Fig. 23, it is out of the way of carriage 50 and performs no function. In fact, the operator pays no attention to this arm when full-length messages are transmitted. However, in the case of a short message he pulls the arm 172 forward to the position 172' in Fig. 23. The lateral extension 179 now rests against the tube 51 in the path of the advancing carriage. The right edge of arm 172 lies next to the inner edge of sleeve 170 which is in the pushed-in position 170'.

Referring to Fig. 22, when the carriage 50 is in position 50a (which may be assumed to represent the advancing side of the carriage) it begins to rock the arm 172 laterally and push the sleeve 170 out to the right. When the carriage reaches the position 50b, it has rocked the arm 172 to position 172b and moved the sleeve 170 outward to open the power switch 157. It is to be assumed that the position 50b of the carriage represents its final position after scanning a short message. By selecting the proper width for the extension 179, the short-message area of a sheet can be determined beforehand. For this purpose the extension 179 can be a separate piece adjustably mounted on the arm 172 in any practical way, as by a slotted connection.

Since the arm 172 remains in forward position, it has to be pushed back by hand and to remind the operator of that, the extension 180 projects over the drum as indicated at 180′. This interferes with the loading and unloading of the drum, thus making sure that the operator will push the short-message arm 172 out of the way. When the carriage 50 is pushed leftward to initial position, the arm 172 is moved back to upright position by the spring 177.

*Amplifier and control unit (Figs. 24–26)*

Each machine, whether used as transmitter or receiver, is electrically connected by a cable to an amplifier and control unit. The parts comprising this unit are enclosed in a small metal box 181 which may form the base of the machine or which may be located in any convenient place near the machine. The box 181 consists of a base plate 182, a rectangular frame or chassis 183 on which various parts of the unit are mounted, and a cover 184. Some of the parts mounted on the frame 183 are indicated in Fig. 25 by the dotted outlines 185 which are supposed to represent transformers, tubes, condensers, relays and other electrical parts that make up the circuits of Figs. 27 to 30.

The base plate 182 has a pair of lugs 186 at one end and a perforated angular piece 187 at the opposite end. The frame 183 is provided at one end with a pair of slots 188, and the cover 184 has similarly arranged slots 189. The lugs 186 on base 182 receive both sets of slots 188 and 189, thereby holding the three parts 182, 183, 184 together to form a closed box. A single screw 190 passing through holes 191 in frame 183 and cover 184 enters the locking piece 187 on the base plate 182 and locks the component parts of the box together.

This construction makes it easy to assemble the parts and to remove the cover for access to the electrical elements on the frame 183. Holes 192 in frame 183 and holes 193 along the lower edge of cover 184 are arranged in alignment for the passage of conductors or cables. When the machine is placed on the box 181, it is secured to the cover of the box in any practical way, as by screws or bolts passing through holes 194 in the top of the cover. The larger holes 194′ in the cover are for ventilation.

*Circuits of Figs. 27–30*

To understand the circuits of our system we should place Fig. 27 above Fig. 28 for the transmitter and place Fig. 29 above Fig. 30 for the receiver. In other words, Figs. 27 and 28 constitute transmitter circuits and Figs. 29 and 30 represent the receiver circuits. Although these two circuit groups appear to be duplicates, as illustrated, they differ functionally during the operation of the system and for that reason it is necessary to show the circuits for each machine. However, a description of Figs. 27 and 28 will also apply to Figs. 29 and 30 except for the functional differences in the transmitting and recording operations.

It will be convenient to use the same reference numerals for certain corresponding parts in Figs. 28 and 30 except that a prime mark will be added to indicate the parts pertaining to the receiver. For example, the synchronous motor that drives the drum is numbered 26 in the transmitter (Fig. 28) and 26′ in the receiver (Fig. 30). Otherwise the numbering will proceed consecutively in order to prevent confusion between transmitter and receiver operations which involve similar parts. In tracing the circuits we shall use the convenient term "wire" to indicate any practical form of electrical connector.

The source of power for the machine is a 115-volt, 60-cycle generator which is represented diagrammatically by a pair of bus bars A and B. When the start button 138 is momentarily pushed in, it closes a switch 195 which energizes a relay 196 through the following circuit: From bus bar A, conductor 197 to point 198, wire 199, switch 195, wire 200, the winding of relay 196, wire 201, through the closed end-of-message switch 144, wire 202 to point 203, and wire 204 to conductor 205 which goes to the grounded bus bar B. The energized relay 196, which we call the power relay, locks from conductor 197 through its tongue 206 and contact 207, wire 208 to point 209, and from there through the relay to bus bar B as above described. The power relay 196 remains energized till the close of a scanning operation.

The synchronous motor 26 which drives the drum 23 is energized from bus bar A through conductor 197, relay contacts 206—207, wire 208 to point 209, wire 200 to point 210, wire 211 through the motor windings (including the condenser 212 which is part of the motor), wire 202 to point 203, wire 204, and from there through conductor 205 to bus bar B. The motor 26 has an additional condenser 213 which does not function when the machine operates as a transmitter. We are to remember that the closing of start switch 195 causes the motor 26 to drive the drum 23 and the commutator 38 at synchronous speed.

The operation of relay 196 in Fig. 28 puts power on the amplifier circuits of Fig. 27 through the energizing of input transformer 214 which consists of a primary coil 215 and three secondary coils 216, 217 and 218. The primary 215 is connected to bus bars A and B by way of leads 205 and 219 through the closed contacts 206—207 of relay 196. A further function of this relay is to complete the circuits of relays 220 and 221 through its contacts 206—207, wire 208, closed switch 137, conductor 222 to wire 223, through both relays in parallel to wire 224, and through conductor 205 to bus bar B.

Another relay 225 is energized upon operation of power relay 196 through the following connections: From bus bar A through the closed relay contacts 206—207 to wire 208, through conductor 219 to point 219′ by wire 226 through relay 225, then by wire 227 to closed relay contact 228, and by wire 229 to bus bar B. Relay 225 locks through contact 229′ which is connected to wire 224. There are two line relays 230 and 231 which are connected by a wire 232 to transmission line L2, but these relays are not energized at this time so they require no further mention here except to say that the relay 230 is of the slow-to-release type for a purpose that will appear later.

A suitable rectifier SR (for example, of the selenium type) is connected to the bus bars A–B through the closed relay contacts 206—207 and wire 208. If this rectifier has only a half-wave output, we provide a filter network to produce a fairly constant voltage in the positive output lead 233. In Fig. 28, this filter network is indicated in a diagrammatic way by the dotted outline FL, including condensers 234—234′ and resistors 235 which are connected as shown. Filters of this kind are well known. The result is a direct current (say, of 120 volts) with a slight ripple but sufficiently steady for relay operation, so we may consider the rectifier SR as a source of battery current and the line 233 may be called the positive battery lead. How the ripple component of this direct current is prevented from affecting the stylus circuit in the recorder mechanism will be explained in due course.

A relay 236 (near the top of Fig. 28) is connected at the plus side to the battery lead 233 and the other side of the relay is grounded. However, at this time the relay 236 is not energized because it is short-circuited through its closed contact 237, wire 238, closed contact 239 of energized relay 225, wire 240 and through the grounded contact 241 of relay 231 which is not energized at this moment. The relay 236 will be designated the phasing relay because it is operated from the receiver at the phasing moment of the system to energize the stylus motor 101, as will be made clear when we describe the automatic phasing operation.

A direct-current relay 242 has one side connected directly to the plus terminal of filter condenser 234' and the other side of the relay goes by a wire 243 to the commutator brush 40. Therefore, every time this brush touches the grounded contact 39 (that is, once for each revolution of drum 23) the charged condenser 234' discharges directly through the relay 242, which is thus energized for a moment to open its contacts 244 and 245. In other words, the relay 242 pulses in synchronism with the transmitter drum 23.

During the intervals when the brush 40 passes over the insulated periphery of commutator 38, the relay 242 is not energized and battery flows from line 233, wire 246, closed relay contact 244, wire 247, contacts 248—249 of energized relay 220, wire 250, contacts 251—252 of energized relay 225, and by wire 253 to line L1. The battery thus put on line L1 of the transmitter is therefore interrupted every time the pulse relay 242 is energized. The transmitter line L1 is connected by a wire 254 to line L2 of the receiver (Fig. 29), and a wire 255 connects line L2 of the transmitter to line L1 of the receiver. In other words, the transmission lines of the two machines are cross-connected, for control in each direction with ground return (marked G. R.).

Summarizing what has happened so far at the transmitter when the start button 138 is pressed, we have this series of events taking place at once: The motor 26 rotates the drum 23 and the phasing commutator 38 at synchronous speed; the transformer 214 is energized to put power into the amplifier circuits; and battery pulses are sent to line L1 of the transmitter at a frequency corresponding to the synchronous rotation of the drum. Nothing else happens at the transmitter up to this moment.

Turning now to the receiver, the battery pulses from the transmitter go over wire 254 to line L2 in the receiver where a wire 256 connects the line relays 230' and 231' to line L2. These relays are connected in series by a wire 257, but the relay 231' is shorted out by the grounded contact 258 of relay 230' when the latter is not energized. Relay 230' is shunted by a large condenser 259 and is of a type that is slow to release.

The receiver relay 231' follows the pulses of the transmitter relay 242 because the relay 230' does not release during the short intervals between pulses, so that the relay contact 258 remains open to remove the short circuit from relay 231'. At the same time the open contact 260 of energized relay 230' prevents the operation of relay 225', while the closed contacts 261—262 cause the operation of the call buzzer 127'. The buzzer circuit goes from bus bar B' to conductor 263, wire 264, relay contacts 261—262, wire 265 through the buzzer coil, wire 266, closed contact 267 of power relay 196' (not energized now) and by wire 268 to bus bar A'.

On hearing the buzzer, the attendant at the receiver places a recording blank 48' on the drum 23', throws the switch 137' to "Receive" (or open) position and presses the start button 138'. This operates the power relay 196' from bus bar A', wire 269 through the closed start switch 195', wire 271, through the relay winding, wire 272, closed switch 144', wire 273, and by wire 274 to the other bus bar B'. When the energized relay 196' opens its contact 267, the circuit of buzzer 137' is broken. The relay 196' locks through its closed contact 275, so that the operator can release the start button 138' at once.

The synchronous motor 26' of the receiver is energized in such a way as to include not only its regular condenser 212' but also the extra condenser 213' which causes the motor to drift or run below synchronous speed. The motor circuit including the condenser 212' can be traced from bus bar A', conductor 263, closed relay contact 275, wires 276, 271 and 277 through the motor windings and condenser 212', and by wire 274 to bus bar B'. The drifting condenser 213' is connected in circuit by wire 278 and closed contact 279 of relay 221' (not energized because switch 137' is open), wire 280, closed contact 281 of phasing relay 236' (not energized now) and by wire 282 to the motor terminal.

The energized relay 196' also connects the power input transformer 283 of the amplifier with the source of power A'—B' from lead 263 through the primary coil 284, conductor 285 and from there through the closed relay contact 275 to bus bar A'. It should be noted that the three relays 220', 221' and 225' are not energized when the machine is set up as a recorder, so that their respective contacts remain as shown in Fig. 30.

The operation of power relay 196' energizes the rectifier SR' which with its filter network FL' supplies a fairly constant voltage to the output lead 233' as previously described for the corresponding parts SR and FL in Fig. 28 of the transmitter circuits. This means that pulse relay 242' of the receiver is energized every time its circuit is grounded through the commutator 38'.

We have, then, this condition in the receiver when the start button 138' is pressed by the attendant: The motor 26' rotates the drum 23' and the commutator 38' at slightly less than synchronous speed. At the same time, the line relay 231' keeps pulsing in tune with the pulse relay 242 of the transmitter. We utilize this condition to put the two machines into phase with each other by the following novel method and control circuits.

*The automatic phasing operation*

It should be noted that at this time we have only the two drum motors 26 and 26' in operation. The two stylus motors 101 and 101' are not yet running, so that no facsimile transmission is taking place. Before that can happen the two scanning drums must be rotating in phase and that is accomplished by bringing the drifting motor 26' up to synchronous speed at a moment when the two drums are in the same angular position.

Let us remember that the line relay 231' of the receiver pulses in response to the synchronous speed of the transmitter motor 26, while the relay 242' pulses at the speed of the drifting motor 26' which runs slightly below synchronism. Every time the relay 231' pulses its grounded tongue 286 opens the contact 287 and grounds the other contact 288. At each pulse of relay 242' the ground is removed from contact 289 and the other contact 290 is opened.

One side of the phasing relay 236' in the receiver is connected to the battery lead 233' and the other side of the relay is grounded. The relay 236' has a tongue 291 associated with a break contact 292 and a make contact 293. The contact 292 is connected to the battery lead 233' by a wire 294. The contact 293 is connected to the plus side of relay 242' by a wire 295. The tongue 291 is grounded in two ways: First, by a wire 296 to the grounded contact 289 of relay 242'. Second, by wires 297 and 298 to the closed contact 299 of relay 220' (not energized) and by wire 300 to the grounded tongue 286 when the relay 231' is energized during a pulse.

It is seen, then, that the relay 236' is grounded out by a short circuit either when the relay 231' is energized or when the relay 242' is released. Only at the instant when the relay 231' releases and the relay 242' pulls up will the ground be removed from contact 291 of relay 236' which will then be energized. Since the simultaneous release of relay 231' and the pulsing of relay 242' can occur only when the commutator contacts 39 and 39' are in the same angular position, it follows that the relay 236' is energized when the two drums 23 and 23' are running in phased relationship.

The operation of the phasing relay 236' at the receiver disconnects the drifting condenser 213' by opening the contact 283, so that the motor 26' now runs at synchronous speed and the scanning drums 23 and 23' operate in unison. The opening of contact 292 removes the ground therefrom and keeps the relay 236' energized during a transmission cycle, while the closing of contact 293 short-circuits the pulse relay 242' through wire 295, contact 293 and by wire 296 to the grounded contact 289 when relay 242' releases. The closing of contact 301 of energized relay 236' operates the stylus motor 101' from lead 268, closed contact 275 of power relay 196', wires 276 and 271, conductor 285 to point 302, wire 303, contact 301, wire 304, through the motor windings, and by wires 305—273—274—263 to bus bar B'.

When the pulse relay 242' is short-circuited by the closing of contact 293 of the energized phasing relay 236', the pulse relay no longer responds to the commutator 38'. As a result steady battery is applied to line L1 of the receiver from lead 233' to wire 306, closed contact 290 of relay 242' (now released), wire 307, closed contact 308 of relay 220' (not energized), wire 309, closed contact 310 of energized relay 236', wire 311, closed contact 312 of relay 225' (not energized), wire 313 and through resistor 314 to line L1.

Now let us see what happens at the transmitter in response to the steady battery coming from the receiver. This battery goes through transmission line 255 to line L2 of the transmitter where it operates relays 230 and 231. The opening of contact 241 of relay 231 removes one ground from contact 237 of relay 236 but this contact is still connected to another ground through closed contact 245 of relay 242 which has not yet operated. The next revolution of commutator 38 closes the circuit of relay 242 which opens its contact 245 and removes the second ground from contact 237. This allows relay 236 to be energized and pull up its contact 315, thereby closing the circuit of stylus motor 101 through wires 316—226—219 and through closed contacts 206—207 of the energized power relay 196 to bus bar A. The other side of the stylus motor goes to bus bar B through wires 317—202—204—205.

The stylus motors 101 and 101' of both machines are therefore started simultaneously when the two drums 23 and 23' are in phase, whereupon the stylus carriage 50 of each machine is automatically lowered to scanning position and facsimile transmission begins. The automatic phasing method we have described is one of the important features of our system for it eliminates the phasing clutch used in larger and more expensive machines. The phasing clutch is not only a costly item but adds to the weight and size of the machine. We believe that we are the first to phase two connected facsimile machines by drifting the speed of one machine relative to the other until the proper phase relationship is established, and we claim this feature of our invention in a fundamental way.

*Facsimile transmission with an electric stylus*

As we explained in Figs. 19 and 20, the subject transmitter drum 23 may consist either of conducting characters on an insulating surface (Fig. 19) or of insulating characters on a conducting sheet (Fig. 20). In either case there is a variation of resistance as the stylus passes from character to background and from background to character. These resistance variations are utilized to modulate the output of a vacuum tube oscillator in such a way that carrier is sent to the lines L1 and L2 of the transmitter only when the stylus passes over the characters.

Referring to Fig. 27, the secondary coil 216 of the power input transformer 214 furnishes current for the heaters 318 of an oscillator tube 319 and an output tube 320. The secondary 217 goes directly to the plates 321 of a full wave rectifier 322, and the filaments 323 of this tube are heated by the secondary 318. The leads 324 and 325 represent the direct current output of rectifier 322, with the points 326 and 327 as the output terminals. Condensers 328 and a resistor 328a form a cascade filter to smooth out the ripples of the rectified waves. A fuse lamp 329 is inserted in one of the rectifier leads to act as a pilot light (showing that the power is on) and also to protect the transformer 214 and rectifier 322 by limiting the current. The rectifier 322 also supplies current to the output unit 330 of the recording amplifier, but as this part is not used in transmitting we may disregard it here.

The plate 331 of oscillator tube 318 is connected to a voltage tap 332 of the rectifier output or plate supply and the cathode 333 of this tube is connected by a wire 334 to contact 335 of relay 221. Since this relay is energized upon operation of start button 138, the contact 335 (and therefore the cathode 333) is grounded at this time. Conductors 336 and 337 are connected respectively to plate 331 and grid 338 of tube 319 and the points 339—340 represent the output terminals of the oscillator. An inductance coil 341 and a condenser 342 connected across the conductors 336—337 constitute the oscillator circuit which provides the carrier for the transmission of facsimile signals. In an actual embodiment of our system we found it convenient to use a carrier frequency of about 1800 cycles so that it could be operated over any telephone pair.

In Fig. 27 there is a dotted rectangle marked BX. The parts within the rectangle constitute a bridge network which is unbalanced to transmit signals when the stylus 60 passes over a marked area. This network is reproduced in Fig 27a in conventional bridge from so that the operation is easier to follow. The four bridge arms of this network are marked E—F—G—H. The output terminals 339 and 340 of the oscillator form the input terminals of the bridge and this input voltage of the oscillator is constant. The two points 343 and 344 in the cross connection 345 constitute the output terminals of the bridge network which is balanced when those two points are at equal potential.

The output terminal 343 is an adjustable tap on a potentiometer 346 which extends into both arms E and F. The opposite terminal 344 is the grounded middle point of the oscillator coil 341 which extends into both arms G and H. The bridge is balanced by adjusting the resistor tape 343, and to make that adjustment less critical we shunt a resistor 347 around the potentiometer 346. The bridge arm E includes a resistor 348 and the opposite arm F contains two resistors 349 and 350. The cross connection 345 contains an adjustable resistor 351 which goes to the grid 352 of output tube 319 through connections to be presently described.

The transmitter stylus 60 is connected to bridge arm E through conductor 353 (Fig. 28), closed contact 354 of energized relay 220, wire 355 and through a high resistor 356 to point 357 on arm E. In Fig. 27a the connection between stylus 60 and bridge arm E is reduced to the simple line 353. For purposes of description we shall assume that the stylus scans a message sheet like that shown in Fig. 20 where the conducting sheet 155 bears wax characters 156. It will be convenient to refer to the resistance of the message sheet (whether insulating or conducting characters are used) as the paper resistance of that portion of the stylus circuit which extends from point 357 on bridge arm E to ground at the middle point 344 of oscillator coil 341.

We thus have a bridge network in which the stylus circuit with its variable paper resistance is shunted around a part of arm E and the entire arm G. Suppose the bridge is to be balanced for the transmission of copy like that shown in Fig. 20. When the stylus 60 is placed directly on the sheet, the paper resistance in the stylus circuit is at a minimum. The operator adjusts the potentiometer 346 until a minimum voltage is indicated in a testing meter connected across the lines L1 and L2 of the transmitter. This shows that the points 343 and 344 of the network are at equal potential and the output of the bridge is a minimum.

The same procedure is followed to balance the bridge for a message sheet consisting of conductive marks on an insulating surface, as in Fig. 19. Here again the stylus is placed on the background of the sheet but this time the paper resistance in the stylus circuit is a maximum, being practically at infinity, since the top surface 153 of the sheet is of insulating material. This condition requires a different adjustment of potentiometer 346 to obtain equal voltages at the output points 343 and 344.

In either case the balanced bridge BX prevents signals from going over the lines L1 and L2 when the stylus 60 rides over the unmarked background of the message sheet. However, when the stylus touches a marked area of the sheet, the resistance in the stylus circuit changes (either increasing or decreasing) and this produces a difference of potential between the output points 343 and 344 of the bridge, so that a current flows through the cross-connection 345. A variable proportion of this output voltage is sent to the grid 352 of tube 320 through the adjustable resistor 351, wire 358, closed contact 359 of energized relay 221 (Fig. 28) and by wires 360 to grid 352.

The plate circuit of output tube 320 is energized from the plus potential point 332 of the rectifier output (we use about 250 volts) by wire 361 through the primary coil 362 of the output transformer 363, wire 364, closed contact 365 of energized relay 221 (Fig. 28) and by wire 366 to plate 367 of the tube. The cathode 368 of this tube is grounded through the usual arrangement 369 of a bias resistor and a by-pass condenser.

Those familiar with this art will understand that the signal voltages impressed on grid 352 of output tube 320 when the stylus 60 passes over a marked area of the message sheet cause corresponding current variations in greatly amplified form to pass through the primary coil 362. The voltage thus induced in the secondary coil 370 of transformer 363 is sent over the transmission lines L1 and L2 to the receiver. The output frequency of the oscillator circuit produced by the elements 341—342 is the carrier for the facsimile signals impressed on grid 352 of output tube 320.

In addition to what we have already said about the construction and operation of the bridge network BX, we call attention to the practical advantages of several features included therein. The high resistor 356 in the stylus circuit decreases the sensitivity of the bridge due to resistance variations that are liable to occur in different sheets of the same kind of paper used. Further, to counterbalance the condenser effect of the shielded wire from stylus to amplifier we insert a condenser 371 in arm E and a condenser 372 in arm F. The condenser 372 is of light capacity and preferably adjustable to take care of different lengths of shielded cable running from the machine itself to the amplifier and control box.

Regarding the use of the bridge circuit in facsimile transmission by an electric stylus from a sheet having marked and unmarked areas of different resistances, we should explain that this idea is the invention of Frank T. Turner as set forth in his copending application Ser. No. 23,534, filed April 27, 1948, and we do not herein make any claim readable on the disclosure of that Turner application.

There are some other details in Figs. 27 and 28 which we shall briefly note before taking up the description of the receiver circuits. Referring to the signal output transformer 363, there are a condenser 373 and a grounded potentiometer or variable resistor 374 connected to one side of the primary coil 362. When the machine operates as a transmitter, the adjustable tap on the resistor 374 is cut out and the two elements 373 and 374 function as a low-pass filter which helps to remove such high frequencies as may be detrimental or undesirable in the transmission of facsimile signals. In the local pulse relay 242, where the contact 244 is connected to the direct current voltage line 233, we add a resistor 375 and a grounded condenser 376 to that contact in order to reduce sparking and interference.

*Recording operation of the receiver*

We have already explained how the receiver is set going when the attendant, in answer to the call buzzer, presses the start button 138'. Let us now observe how the receiver responds to the facsimile signals coming from the transmitter.

At the signal input end of the recording amplifier (Fig. 29) is a transformer 377 with a primary coil 378 and a secondary coil 379 which is isolated from battery current by a condenser 380. One side of the secondary 379 goes by a wire 381 to a voltageg tap 382 in the output of a vacuum tube rectifier 383 which is connected to the power input transformer 283 as described for the rectifier 322 in Fig. 27. The other side of the secondary coil 379 is connected through a condenser 384 and a potentiometer 385 to the grid 386 of an input tube 387. This connection goes from the variable resistor tap 388 by a wire 389, closed contact 390 of relay 221' (not energized for recording) and by wire 391 to grid 386. The potentiometer 385, therefore, controls the signal voltage of tube 387 for recording.

The plate 392 of the signal input tube 387 is connected to the voltage tap 382 of rectifier 383 through the following circuit: by wire 393 to the closed contact 394 of relay 221' (not energized), wire 395 and through resistor 396 to point 382. The cathode 397 of tube 387 is connected to ground through a bias resistor 398 and a by-pass condenser 399.

The signal input tube 387 is coupled to a beam power tube 400 which forms the output of the recording amplifier. The control grid 401 of this tube is connected to conductor 395 through a condenser 402 and a grounded resistor 403, whereby the plate circuit of tube 387 controls the output of tube 400. The plate 404 of tube 400 is connected by wire 405 to an adjustable voltage tap 406 on a resistor 407 in the output circuit of rectifier 383. An inductor 408 is included in wire 405 to act as a low impedance coupling between the output tube 400 and the recording stylus 60' (Fig. 30). The recording circuit includes wire 405, condenser 409, wire 410, closed contact 411 of relay 220' (not energized) and wire 412, to which the stylus 60' is connected.

The screen grid 413 of beam tube 400 is connected to wire 405 and therefore to the voltage tap 406. The cathode 414 and the beam plate 415 of tube 400 are connected by a wire 416 to an adjustable voltage tap 418 on a resistor 419 in the output of rectifier 383. A third resistor 420 in the rectifier output is in series with the variable resistors 407 and 419 to form a voltage divider for tubes 387 and 400. In a typical adjustment for a receiver we used 280 volts at point 406 for the plate and screen grid voltage of tube 400; at point 382 we used 240 volts for the secondary 379 of input transformer 377 and the plate voltage of input tube 387; and at point 418 we used about 18 volts for the cathode 414 and beam plate 415 of output tube 400. These figures, of course, are given merely by way of example.

From the preceding description of the recording amplifier it will be seen that facsimile signals from the transmitter are superimposed on the direct current in the secondary coil 379 of input transformer 377 and impressed upon the grid 386 of input tube 387. This tube amplifies the signals which then go to the control grid 401 of beam tube 400 for further amplification. The plate output of tube 400 goes through condenser 409 to the recording stylus 60' which causes the signal impulses to be recorded on electrosensitive paper in a manner well understood by facsimile experts. Since signal impulses are sent from the transmitter to the receiver only when the transmitting stylus passes over characters on the message sheet, the recording stylus produces a positive copy of the original message without the need of signal inverters used in prior facsimile systems.

The amplifier circuits shown in Figs. 27 and 29 contain certain novel features of practical importance. As we said in the beginning of this specification, the primary object of this invention was to produce a facsimile machine and system of extreme simplicity and low cost. To that end we designed a machine that works equally well for transmitting and recording, it being only necessary to throw a switch to set the machine for either operation. The amplifier unit connected with the machine serves both for transmitting and recording with certain parts used for both operations and other parts used for transmitting or receiving only.

Thus, we require but four vacuum tubes of which only three are in operation for transmitting (oscillator tube 319, output tube 320 and rectifier tube 322 in Fig. 27 and only three tubes operate for recording (rectifier tube 383, input tube 387 and output tube 400 in Fig. 29). Only two transformers, a power input transformer (214 in Fig. 27 and 283 in Fig. 29) and a transformer connected to the lines L1 and L2 for operating as a signal output in transmitting (transformer 363 in Fig. 27) and operating as a signal input for recording (transformer 377 in Fig. 29).

For direct current control, we preferably use a selenium rectifier because it is a small inexpensive device which furnishes sufficiently steady current for operation of the relays. The vacuum tube rectifier (322 in Fig. 27 and 383 in Fig. 29) is so small that it could not carry the additional load of providing power for the relays. A more powerful rectifier would be too large and expensive for our purpose, so that by using the selenium rectifier for relay control we cut down the size and cost of the machine.

When our amplifier operates for transmitting, we use only one amplifying tube, namely 320, into which the signals are fed from the bridge BX. In the recording operation, where the oscillator and bridge are entirely cut out, the incoming signals are amplified by the input triode 387 (which corresponds to tube 320 in Fig. 27) and the output pentode 400 to which the recording stylus is connected.

In designing the amplifier for recording operation, we had to consider the fact that the direct current supplied by the selenium rectifier (SR or SR') was not free from rippling even after passing through the connected filter (FL or FL') and that this direct current had to be connected to the output transformer 363 when transmitting. In other words, the facsimile signals received by the input transformer 377 in Fig. 29 are mixed with a ripple or hum voltage at a much higher level than the received signal voltage. It is necessary to reduce this ripple or hum voltage far below the signal level so that the hum will not be recorded. This result is accomplished by the following filter circuits and devices.

Referring to Fig. 29, the parts that primarily perform the function of filtering ripples out of the stylus circuit are the three condensers 380, 384 and 402 and the output choke or inductor 408. These condensers are of low capacity so that the higher signal frequencies will be passed and amplified much more than the low ripple or humming frequencies. Condenser 380 also prevents direct current from being shunted from line L1 to line L2 through the primary winding 378 of transformer 377, thereby allowing proper operation of the control cicuits. Condenser 384 blocks direct current from the grid 386 of tube 377.

Of special importance is the inductor 408 which is used in place of the output transformer found in prior recording amplifiers, so that we have here another cost reducing item. The inductor 408 has a very low impedance to hum and ripple which are therefore shunted out of the stylus circuit, while the higher frequency will not go through the inductor. Condenser 409 prevents direct current from reaching the stylus 60' which thus operates to record only the facsimile signals received from the distant transmitter.

*Transmission and recording of short messages*

We explained heretofore that the operation of switch 144 (or 144') by the scanning carriage at the end of a long message automatically shuts down both machines. However, when transmitting a short message in a machine not provided with the short-message attachment of Figs. 22 and 23, the operator at the transmitter has to open the end-of-message switch 144 by hand after the complete message has been scanned. This shuts down the transmitter, but in the receiver the end-of-message switch 144' remains closed because the scanning carriage has not reached the end of its travel.

To understand what happens at the receiver at the close of transmitting a short message, we should bear in mind that during transmission steady battery is applied to line L1 of the transmitter and goes to line L2 of the receiver where it keeps the line relays 230' and 231' energized. The open contact 260 of relay 230' prevents the relay 225' from being operated. Now, when the attendant at the transmitter closes the end-of-message switch 144 by hand, he takes all power off the transmitter and stops battery to line L2 of the receiver, thereby releasing the relays 230' and 231'.

With the relay contact 260 now closed, the relay 225' is energized from bus bar B' through conductor 264, contact 260, wire 421, through the relay winding, wires 393—285—271—276, closed contact 275 of the energized power relay 196' and by wire 268 to bus bar A'. The closed contact 422 of energized relay 225' lights the signal lamp 140' from the power transformer 283 (Fig. 29) through conductor 423 and the closed contact 424 of relay 220' (not energized during recording). The lighted lamp 140', which shines through the colored jewel 139 in the front panel of the machine, tells the attendant at the receiver that the message is through and thereupon he opens his end-of-message switch 144' by hand. The machine is now shut down.

*Safety provisions*

In a machine like ours, adapted to be set up for different operations, it is to be expected that occasionally the operator will start the machine with the switch 137 (or 137') in the wrong position. To remind the attendant instantly of that fact and also to prevent any harm being done the machine when that happens, we have incorporated certain safety features in the circuits.

Suppose the machine is to be operated as a transmitter with the switch 137 accidentally left in "Receive" position. When the operator presses the start button 138, the drum motor 26 operates, the relay 225 is energized and power is put into the transformer 214. The lamp 140 (Fig. 28) lights from the transformer 214 through wire 425, closed contact 426 of energized relay 225, wire 427, closed contact 428 of relay 220 (not energized) and through the lamp to ground. No battery is sent to the line to call the receiver and the scanning carriage remains in raised position. The illuminated jewel (usually red) warns the operator that something is wrong and he will throw the switch 137 to "Send" position, whereupon the machine will operate as previously described.

If the receiver should be set up by mistake as a transmitter after a call has been received, the pressing of start button 138' (Fig. 30) will operate relay 220' but relay 225' will not be energized due to the open contact 260 of energized relay 230'. Therefore, the signal lamp 140' will be lighted from transformer 383 (Fig. 29) through wire 423, closed contact 429 of inert relay 225', wire 430, closed contact 431 of energized relay 220' and through the lamp to ground. When the signal light appears, the attendant will operate the end-of-message switch by hand to turn the machine off, throw the switch 137 to "Receive" position and restart the machine, which will now be in condition to record the received signals. Of course, it is understood that a buzzer or other indicator may be used with or in place of lamp 140'.

While we have shown and described certain specific apparatus and circuits, it will be apparent that our invention is not limited to the details set forth, for various changes and modifications are possible within the scope of the appended claims.

We claim as our invention:

1. In a facsimile machine having a rotary drum, the combination of a stationary tube arranged parallel with said drums, a carriage slidably mounted on said tube and carrying means to scan a sheet on the drum, driving mechanism including a line arranged within said tube and attached at its free end to said carriage, the other end of the line being connected to said mechanism, and means whereby a pull on the line in one direction by said mechanism causes the line to feed the carriage along said tube in the opposite direction.

2. In a facsimile machine having a rotary drum, the combination of a stationary tube arranged parallel with said drum, a scanning carriage mounted on said tube and having a pin which extends into the tube through a longitudinal slot thereof, said pin and slot arrangement permitting the carriage to slide along the tube, a line attached to said pin, and a reel operable to wind up said line which is so disposed within said tube that winding up the line feeds the carriage uniformly along the tube during a scanning operation.

3. A facsimile machine having a rotary drum, a stationary tube arranged parallel with said drum, a carriage slidably mounted on said tube and carrying a stylus to scan a sheet on said drum, a pin on said carriage extending into the tube through a longitudinal slot thereof, said slot having an offset at its starting end arranged to receive said pin for automatically lifting the carriage as it reaches the end of its return movement, whereby the drum remains unobstructed for loading and unloading, and means for sliding said carriage forward during a scanning operation, said offset end of the slot automatically lowering the carriage as it begins its forward travel.

4. A facsimile machine having a horizontal rotary drum, a track supported parallel with said drum, a carriage slidably and pivotally mounted on said track so as to occupy a horizontal scanning position and a lifted or rest position, said carriage having a chamber in which a stylus is mounted, and a pivotally mounted supporting member for said stylus adapted to project the latter out of said chamber and hold it in pressure contact with a sheet on said drum when the carriage is in horizontal position, said supporting member being movable relatively to the carriage for automatically retracting the stylus into the chamber when the carriage is moved to rest position.

5. A facsimile machine having a horizontal rotary drum, a track supported parallel with said drum, a stylus carriage slidably and pivotally mounted on said track so as to occupy a horizontal scanning position and a lifted or rest position, said carriage having a chamber in which an arm is pivotally mounted, a stylus carried by said arm and arranged to project out of said chamber into contact with a sheet on said drum when the carriage is in horizontal position, and a weight on said arm for exerting pressure on said stylus during scanning, said weight automatically rocking said arm on its pivot when the carriage rises to rest position so as to retract the stylus into said chamber.

6. A facsimile machine having a scanning carriage which comprises a casing adapted to be operatively mounted, an insulating plate removably attached to the bottom of said casing and forming a cover for the casing chamber, a bracket in said chamber mounted on said plate, an arm pivotally supported on said bracket, and a stylus on said arm arranged to project through a hole in said plate when the carriage is in scanning position, said arm being movable to retract the stylus completely into the casing chamber.

7. A facsimile machine having a horizontal rotary drum for holding a sheet in scanning position, a track supported parallel with said drum, a stylus carriage comprising an elongated frame mounted at its rear end on said track for slidable and pivotal movement thereon, said carriage extending forwardly over said drum, a stylus movably mounted on said carriage, means for urging said stylus into predetermined pressure contact with a sheet on said drum, and a shoe on the bottom of said carriage arranged to ride over said sheet in advance of said stylus to press the sheet down on the drum along the line of stylus contact, said shoe supporting the weight of the carriage.

8. A facsimile machine having a horizontal rotary drum for supporting a sheet in scanning position, a track arranged parallel with said drum, a carriage supported on said track for slidable movement, a stylus mounted on said carriage for scanning a sheet on the drum, connections between said carriage and said track whereby the carriage can be raised and lowered to move the stylus into and out of scanning position, and a member arranged to be engaged by said carriage when the latter is lowered at start position, said engagement of the carriage with said member occurring just before the carriage reaches the drum, whereby the sudden dropping of the carriage on the drum is prevented.

9. A facsimile machine having horizontal rotary drum for supporting a sheet in scanning position, a ring at one end of said drum, a track arranged parallel with said drum, a carriage supported on said track for slidable movement, a stylus mounted on said carriage for scanning a sheet on the drum, connections whereby the carriage can be raised and lowered to move the stylus into and out of scanning position, and a plate on the bottom of said carriage having a shoe adapted to hold the scanned sheet pressed down on the drum in advance of the stylus, said plate being arranged to engage said ring when the carriage is lowered at start position for camming the latter gradually onto the drum, whereby the sudden dropping of the carriage shoe on the drum is prevented.

10. In a facsimile machine having a rotary drum adapted to have a sheet supported thereon for scanning, the combination of a track arranged parallel with said drum, a carriage slidably mounted on said track, a connection between said carriage and track for permitting pivotal movement of the carriage on the track in a plane at right angles to the axis of the drum, whereby the carriage can be swung into scanning position on the drum and swung out to clear the drum for loading and unloading, a stylus mounted on said carriage to scan a sheet on the drum, and driving connections including a line attached to the carriage to feed the latter along the track during a scanning operation, said line being arranged substantially on the pivotal axis of said carriage whereby to permit said pivotal movements of the carriage.

11. In a facsimile machine having a rotary drum for holding a sheet to be scanned, a motor for operating said drum, a fixed track arranged parallel with said drum and a carriage slidably mounted on said track in scanning relation to the drum, the combination of a switch for the motor circuit, a member slidably mounted on said track for operating said switch to closed and open positions for starting and stopping said motor, means whereby said member is automatically operated by said carriage to motor stopping position when the carriage reaches a predetermined point in its scanning travel on said track, said slidable member being manually operable in either direction independently of said carriage to start or stop the motor at will, and means for causing said switch operating member to remain in either position until moved to the other position by hand or by the carriage.

12. In a facsimile machine having a fixed track on which a scanning carriage is slidably mounted, the combination of a power switch for said machine, a sleeve slidably mounted on one end of said track in the path of the advancing carriage, and an operative connection between said sleeve and switch for opening the latter when the carriage actuates the sleeve at the end of a scanning operation, said sleeve being manually operable to close said switch for starting the machine.

13. A facsimile machine having a fixed track on which a scanning carriage is slidably mounted, a power switch for the machine, a switch operating member movably mounted on said track in the path of the advancing carriage which operates said member to open the switch at the end of its path of travel after scanning a full-length message, and a device arranged to be interposed between the carriage and said member in such position that the carriage actuates said device which thereupon operates said member to open the power switch before the carriage is at the end of its prescribed path of travel, whereby the machine is automatically shut down after scanning a short message.

14. A facsimile machine comprising a motor, a shaft driven thereby, a drum mounted on said shaft for supporting copy to be scanned, a tube supported in parallel relation to said drum, a carriage slidably mounted on said tube and carrying a stylus adapted to scan a sheet on said drum, a second motor, a shaft driven thereby and disposed at right angles to said tube, a reel mounted on said shaft and a line attached at one end to said reel and at the other end to said carriage, said line being so arranged within said tube that the operation of said reel to wind up the line slides the carriage uniformly along the tube during a scanning operation.

15. In a facsimile machine having a rotary scanning drum, a tube supported parallel to said drum and having a longitudinal slot, a stylus carriage slidably mounted on said tube for scanning a sheet on the drum, said carriage having a projection extending through the slot in said tube, a motor operated reel supported near one end of said tube at right angles thereto, a line wound on said reel and extending at its free end into said tube, means arranged in said tube at its other end for reversing the line, the free end of the reversed line being attached to said projection on the carriage, whereby the winding up of the line on said reel slides the carriage forward along said track during a scanning operation, and coupling means for said reel adapted to permit unwinding of the line for the return of said carriage to initial position.

16. In a facsimile machine having a rotary scanning drum, a track supported parallel to said drum, a carriage slidably and pivotally mounted on said track, the pivotal mounting of the carriage permitting it to be swung into and out of scanning position, said carriage comprising a casing provided with a chamber which has a wall with a hole therein, a stylus mounted in said chamber in such position that the stylus point projects through said hole into scanning contact with a sheet on said drum when the carriage is in scanning position, and means whereby the pivotal movement of said carriage out of scanning position automatically withdraws the stylus into said chamber and thus completely encloses the stylus point.

17. In a facsimile machine having a rotary drum for holding a sheet to be scanned, and a motor for operating said drum, the combination of a fixed tube supported at one end and arranged parallel to said drum, a carriage slidably mounted on said tube in scanning relation to said drum, a cap slidably supported on the free end of said tube, a rod connected to said cap and extending through the supported end of said tube, a switch for the motor circuit, and means for operatively connecting said rod to said switch whereby movement of said cap in one direction closes said switch and movement of the cap in the other direction opens the switch, said cap and switch remaining in either actuated position.

18. A scanning carriage for a facsimile machine comprising a substantially closed housing, an arm disposed within said housing and pivotally mounted thereto at one end, a pair of spaced spring extensions on the other end of said arm and a stylus carrying rib mounted on said extensions in releasable locking engagement, said spring extensions holding the stylus firmly in position to project out of said housing for scanning.

19. A facsimile machine having a horizontal rotary drum, a track supported parallel to said drum, a stylus carriage pivotally mounted on said track to permit movement thereof toward said drum into scanning position and away from said drum into rest position, said carriage, in scanning position, being slidable on said track for scanning a sheet on said drum, mechanism for operating said carriage at constant scanning speed along said track, means for automatically moving said carriage from scanning to rest position by movement thereof to one end of said track and for automatically moving said carriage from rest position to scanning position when the carriage begins to move in response to the starting of said operating mechanism, and means permitting manual return of the carriage from final standing to initial rest position.

References Cited in the file of this patent

UNITED STATES PATENTS

| | | |
|---|---|---|
| 268,239 | Johnson et al. | Nov. 28, 1882 |
| 1,469,988 | Bryce | Oct. 9, 1923 |
| 1,494,034 | Stevens | May 13, 1924 |
| 1,580,225 | Watson | Apr. 13, 1926 |
| 1,897,796 | Fulton | Feb. 14, 1933 |
| 2,040,501 | Sawford | May 12, 1936 |
| 2,113,069 | Ross et al. | Apr. 5, 1938 |
| 2,153,858 | Wise | Apr. 11, 1939 |
| 2,191,867 | Schore | Feb. 27, 1940 |
| 2,260,511 | Cooley | Oct. 28, 1941 |
| 2,266,802 | Ressler | Dec. 23, 1941 |
| 2,316,906 | Wait | Apr. 20, 1943 |
| 2,340,279 | Wallace | Jan. 25, 1944 |
| 2,365,741 | Wise et al. | Dec. 26, 1944 |
| 2,390,178 | Rutherford | Dec. 4, 1945 |
| 2,441,213 | Sutter | May 11, 1948 |
| 2,464,790 | Finch | Mar. 22, 1949 |
| 2,496,552 | Lewis | Feb. 7, 1950 |
| 2,503,311 | Wise et al. | Apr. 11, 1950 |
| 2,522,147 | Todd et al. | Sept. 12, 1950 |
| 2,540,081 | Alden | Feb. 6, 1951 |